US012081783B2

(12) United States Patent
Wang

(10) Patent No.: US 12,081,783 B2
(45) Date of Patent: Sep. 3, 2024

(54) OLS FOR MULTIVIEW SCALABILITY

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/700,017

(22) Filed: Mar. 21, 2022

(65) Prior Publication Data
US 2022/0210458 A1 Jun. 30, 2022

Related U.S. Application Data

(63) Continuation of application No. PCT/US2020/051608, filed on Sep. 18, 2020.

(60) Provisional application No. 62/905,132, filed on Sep. 24, 2019.

(51) Int. Cl.
*H04N 19/46* (2014.01)
*H04N 19/169* (2014.01)
*H04N 19/172* (2014.01)

(52) U.S. Cl.
CPC ........... *H04N 19/46* (2014.11); *H04N 19/172* (2014.11); *H04N 19/188* (2014.11); *H04N 19/1883* (2014.11)

(58) Field of Classification Search
CPC ............... H04N 19/172; H04N 19/188; H04N 19/1883; H04N 19/33; H04N 19/36; H04N 19/46; H04N 19/597; H04N 19/70
USPC ................................................... 375/240.26
See application file for complete search history.

(56) References Cited

U.S. PATENT DOCUMENTS

| 9,467,700 | B2 | 10/2016 | Wang et al. |
| 10,356,415 | B2 * | 7/2019 | Wang .................... H04N 19/119 |
| 10,645,404 | B2 * | 5/2020 | Wang ..................... H04N 19/37 |
| 2014/0301441 | A1 * | 10/2014 | Wang ................... H04N 19/597 |
| | | | 375/240.02 |
| 2015/0016532 | A1 | 1/2015 | Chen |

(Continued)

FOREIGN PATENT DOCUMENTS

| CN | 105409219 A | 3/2016 | |
| CN | 105409219 B * | 8/2019 | ............. H04N 19/30 |

(Continued)

OTHER PUBLICATIONS

"Line Transmission of Non-Telephone Signals Video Codec for Audiovisual Services At p x 64 kbits," ITU-T Recommendation H.261, Mar. 1993, 29 pages.

(Continued)

*Primary Examiner* — Behrooz M Senfi
(74) *Attorney, Agent, or Firm* — Conley Rose, P.C.

(57) ABSTRACT

A video coding mechanism is disclosed. The mechanism includes receiving a bitstream comprising an output layer set (OLS) and a video parameter set (VPS). The OLS includes one or more layers of coded pictures and the VPS includes an OLS mode identification code (ols_mode_idc) specifying that for each OLS, all layers in the each OLS are output layers. The output layers are determined based on the ols_mode_idc in the VPS. A coded picture from the output layers is decoded to produce a decoded picture. The decoded picture is forwarded for display as part of a decoded video sequence.

12 Claims, 11 Drawing Sheets

(56) References Cited

U.S. PATENT DOCUMENTS

| | | | |
|---|---|---|---|
| 2015/0103907 A1* | 4/2015 | Hendry | H04N 19/597 |
| | | | 375/240.12 |
| 2017/0006300 A1* | 1/2017 | Tsukuba | H04N 19/17 |
| | | | 375/240.25 |
| 2017/0019673 A1 | 1/2017 | Tsukuba et al. | |
| 2022/0345745 A1* | 10/2022 | Deshpande | H04N 19/70 |

FOREIGN PATENT DOCUMENTS

| | | | | |
|---|---|---|---|---|
| EP | 3107299 A1 | 12/2016 | | |
| JP | 2016529781 A | 9/2016 | | |
| RU | 2653299 C2 | 5/2018 | | |
| WO | 2015137237 A1 | 9/2015 | | |
| WO | WO-2015137432 A1 * | 9/2015 | | H04N 19/30 |

OTHER PUBLICATIONS

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

JVET-O2001-vE, Bross, B., et al. "Versatile Video Coding (Draft 6)," Joint Video Experts Team (JVET) of ITU-T Sg 16 WP 3 and ISO/IEC JTC 1/SC 29/WG 11, 15th Meeting: Gothenburg, SE, Jul. 3-12, 2019, 455 pages.

Document: JVET-R0107-v2, Deshpande, S., et al., "AHG8/ AHG9: On Temporal Sublayers Information", Joint Video Experts Team (JVET) of ITU-T SG 16 WP 3 and ISO/IEC JTC 1/SC 29/WG 11, 18th Meeting: by teleconference, Apr. 15-24, 2020, 8 pages.

Ye-Kui Wang, "Hybrid codec scalability design-output of AHG15," Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014, JCTVC-Q0015_attach, 28 pages.

Sachin Deshpande, et al., "AHG8/ AHG9: On Temporal Sublayers Information," Joint Video Experts Team (JVET) of ITU-T SG 16 WP 3 and ISO/IEC JTC 1/SC 29/WG 11, 18th Meeting: by teleconference, Apr. 15-24, 2020, JVET-R0107-v1, 8 pages.

* cited by examiner

OLS FOR MULTIVIEW SCALABILITY

CROSS-REFERENCE TO RELATED APPLICATIONS

This patent application is a continuation of International Application No. PCT/US2020/051608, filed Sep. 18, 2020 by Ye-Kui Wang, and titled "OLS For Multiview Scalability," which claims the benefit of U.S. Provisional Patent Application No. 62/905,132 filed Sep. 24, 2019 by Ye-Kui Wang, and titled "Signaling Of Output Layer Sets For Multiview Scalability," which is hereby incorporated by reference.

TECHNICAL FIELD

The present disclosure is generally related to video coding, and is specifically related to configuring output layer sets (OLSs) in multi-layer bitstreams to support spatial and signal to noise (SNR) scalability for multiview video.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented by a decoder, the method comprising: receiving, by a receiver of the decoder, a bitstream comprising an output layer set (OLS) and a video parameter set (VPS), wherein the OLS includes one or more layers of coded pictures and the VPS includes an OLS mode identification code (ols_mode_idc) specifying that, for each OLS, all layers in the each OLS are output layers; determining, by a processor of the decoder, the output layers based on the ols_mode_idc in the VPS; and decoding, by a processor of the decoder, a coded picture from the output layers to produce a decoded picture.

Some video coding systems are configured to only decode and output the highest encoded layer as denoted by a layer ID along with one or more indicated lower layers. This can present a problem for scalability, because a decoder may not wish to decode the highest layer. Specifically, a decoder generally requests the highest layer that the decoder can support, but the decoder is generally unable to decode a layer that is higher than the requested layer. As a specific example, a decoder may wish to receive and decode a third layer out of fifteen total encoded layers. The third layer can be sent to the decoder without layers four through fifteen as such layers are not needed to decode the third layer. But the decoder may be unable to properly decode and display the third layer because the highest layer (layer fifteen) is not present and the video system is directed to always decode and display the highest layer. This results in an error when video scalability is attempted in such systems. This may be a significant problem because requiring that decoders always support the highest layer results in a system that cannot scale to intermediate layers based on different hardware and network requirements. This issue is compounded when multiview is employed. In multiview, more than one layer is output for display. For example, a user may employ a headset and different layers may be displayed to each eye to create the impression of three dimensional (3D) video. Systems that fail to support scalability also fail to support multiview scalability.

The present example includes a mechanism to support multiview scalability. The layers are included in OLSs. The encoder can send an OLS containing the layers to scale to a particular characteristic, such as size or SNR. Further, the encoder may transmit an ols_mode_idc syntax element, for example in a VPS. The ols_mode_idc syntax element can be set to one to indicate the use of multiview scalability. For example, the ols_mode_idc can indicate that a total number of OLSs is equal to the total number of layers specified in the VPS, that an i-th OLS includes layers zero to i, inclusive, and that for each OLS all layers are considered as output layers. This supports scalability as the decoder can receive and decode all layers in a particular OLS. Since all layers are output layers, the decoder can select and render desired output layers. In this way, the total number of layers encoded may not have an effect on the decoding process and the error may be avoided while still providing scalable multiview video. As such, the disclosed mechanisms increase the functionality of an encoder and/or a decoder. Further, the disclosed mechanisms may decrease bitstream size, and hence reduce processor, memory, and/or network resource utilization at both the encoder and the decoder. In a particular embodiment, employing ols_mode_idc provides bit savings in encoded bitstreams that contain multiple OLSs, among which many data are shared, thus providing savings in steaming servers and providing bandwidth savings for transmitting such bitstreams. For example, the benefit of setting the ols_mode_idc to one is to support use cases such as multiview applications, wherein two or more views, each represented by one layer, are to be output and displayed simultaneously.

Optionally, in any of the preceding aspects, another implementation of the aspect provides, wherein the ols_mode_idc specifies that a total number of OLSs specified by the VPS is equal to a number of layers specified by the VPS.

Optionally, in any of the preceding aspects, another implementation of the aspect provides, wherein the ols_mode_idc specifies that an i-th OLS includes layers with layer indices from zero to i, inclusive.

Optionally, in any of the preceding aspects, another implementation of the aspect provides, wherein the ols_mode_idc is equal to one.

Optionally, in any of the preceding aspects, another implementation of the aspect provides, wherein the VPS includes a VPS maximum layers minus one (vps_max_layers_minus1) that specifies the number of layers specified by the VPS, which is a maximum allowed number of layers in each coded video sequence (CVS) referring to the VPS.

Optionally, in any of the preceding aspects, another implementation of the aspect provides, wherein the total number of OLSs (TotalNumOlss) is equal to vps_max_layers_minus1 plus one when the ols_mode_idc is equal to zero or when the ols_mode_idc is equal to one.

Optionally, in any of the preceding aspects, another implementation of the aspect provides, wherein a number of layers in an i-th OLS (NumLayersInOls[i]) and a network abstraction layer (NAL) unit header layer identifier (nuh_layer_id) value of a j-th layer in the i-th OLS (LayerIdInOLS[i][j]) are derived as follows:

```
NumLayersInOls[ 0 ] = 1
LayerIdInOls[ 0 ] [ 0 ] = vps_layer_id[ 0 ]
for( i = 1, i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc = = 0 | | ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
``` where vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer.

In an embodiment, the disclosure includes a method implemented by an encoder, the method comprising: encoding, by a processor of the encoder, a bitstream comprising one or more OLSs including one or more layers of coded pictures; encoding into the bitstream, by the processor, a VPS, wherein the VPS includes an ols_mode_idc specifying that for each OLS, all layers in the each OLS are output layers; and storing, by a memory coupled to the processor, the bitstream for communication toward a decoder.

Some video coding systems are configured to only decode and output the highest encoded layer as denoted by a layer ID along with one or more indicated lower layers. This can present a problem for scalability, because a decoder may not wish to decode the highest layer. Specifically, a decoder generally requests the highest layer that the decoder can support, but the decoder is generally unable to decode a layer that is higher than the requested layer. As a specific example, a decoder may wish to receive and decode a third layer out of fifteen total encoded layers. The third layer can be sent to the decoder without layers four through fifteen as such layers are not needed to decode the third layer. But the decoder may be unable to properly decode and display the third layer because the highest layer (layer fifteen) is not present and the video system is directed to always decode and display the highest layer. This results in an error when video scalability is attempted in such systems. This may be a significant problem because requiring that decoders always support the highest layer results in a system that cannot scale to intermediate layers based on different hardware and network requirements. This issue is compounded when multiview is employed. In multiview, more than one layer is output for display. For example, a user may employ a headset and different layers may be displayed to each eye to create the impression of three dimensional (3D) video. Systems that fail to support scalability also fail to support multiview scalability.

The present example includes a mechanism to support multiview scalability. The layers are included in OLSs. The encoder can send an OLS containing the layers to scale to a particular characteristic, such as size or SNR. Further, the encoder may transmit an ols_mode_idc syntax element, for example in a VPS. The ols_mode_idc syntax element can be set to one to indicate the use of multiview scalability. For example, the ols_mode_idc can indicate that a total number of OLSs is equal to the total number of layers specified in the VPS, that an i-th OLS includes layers zero to i, inclusive, and that for each OLS all layers are considered as output layers. This supports scalability as the decoder can receive and decode all layers in a particular OLS. Since all layers are output layers, the decoder can select and render desired output layers. In this way, the total number of layers encoded may not have an effect on the decoding process and the error may be avoided while still providing scalable multiview video. As such, the disclosed mechanisms increase the functionality of an encoder and/or a decoder. Further, the disclosed mechanisms may decrease bitstream size, and hence reduce processor, memory, and/or network resource utilization at both the encoder and the decoder. In a particular embodiment, employing ols_mode_idc provides bit savings in encoded bitstreams that contain multiple OLSs, among which many data are shared, thus providing savings in steaming servers and providing bandwidth savings for transmitting such bitstreams. For example, the benefit of setting the ols_mode_idc to one is to support use cases such as multiview applications, wherein two or more views, each represented by one layer, are to be output and displayed simultaneously.

Optionally, in any of the preceding aspects, another implementation of the aspect provides, wherein the ols_mode_idc specifies that a total number of OLSs specified by the VPS is equal to a number of layers specified by the VPS.

Optionally, in any of the preceding aspects, another implementation of the aspect provides, wherein the ols_mode_idc specifies that an i-th OLS includes layers with layer indices from zero to i, inclusive Optionally, in any of the preceding aspects, another implementation of the aspect provides, wherein the ols_mode_idc is equal to one.

Optionally, in any of the preceding aspects, another implementation of the aspect provides, wherein the VPS includes a vps_max_layers_minus1 that specifies the number of layers specified by the VPS, which is a maximum allowed number of layers in each CVS referring to the VPS.

Optionally, in any of the preceding aspects, another implementation of the aspect provides, wherein the TotalNumOlss is equal to vps_max_layers_minus1 plus one when the ols_mode_idc is equal to zero or when the ols_mode_idc is equal to one.

Optionally, in any of the preceding aspects, another implementation of the aspect provides, wherein a NumLayersInOls[i] and a LayerIdInOLS[i][j] are derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc = = 0 | | ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
``` where vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising an OLS and a VPS, wherein the OLS includes one or more layers of coded pictures and the VPS includes an ols_mode_idc specifying that for each OLS, all layers in the each OLS are output layers; a determining means for determining the output layers based on the ols_mode_idc in the VPS; a decoding means for decoding a coded picture from the output layers to produce a decoded picture; and a forwarding means for forwarding the decoded picture for display as part of a decoded video sequence.

Some video coding systems are configured to only decode and output the highest encoded layer as denoted by a layer ID along with one or more indicated lower layers. This can present a problem for scalability, because a decoder may not wish to decode the highest layer. Specifically, a decoder generally requests the highest layer that the decoder can support, but the decoder is generally unable to decode a layer that is higher than the requested layer. As a specific example, a decoder may wish to receive and decode a third layer out of fifteen total encoded layers. The third layer can be sent to the decoder without layers four through fifteen as such layers are not needed to decode the third layer. But the decoder may be unable to properly decode and display the third layer because the highest layer (layer fifteen) is not present and the video system is directed to always decode and display the highest layer. This results in an error when video scalability is attempted in such systems. This may be a significant problem because requiring that decoders always support the highest layer results in a system that cannot scale to intermediate layers based on different hardware and network requirements. This issue is compounded when multiview is employed. In multiview, more than one layer is output for display. For example, a user may employ a headset and different layers may be displayed to each eye to create the impression of three dimensional (3D) video. Systems that fail to support scalability also fail to support multiview scalability.

The present example includes a mechanism to support multiview scalability. The layers are included in OLSs. The encoder can send an OLS containing the layers to scale to a particular characteristic, such as size or SNR. Further, the encoder may transmit an ols_mode_idc syntax element, for example in a VPS. The ols_mode_idc syntax element can be set to one to indicate the use of multiview scalability. For example, the ols_mode_idc can indicate that a total number of OLSs is equal to the total number of layers specified in the VPS, that an i-th OLS includes layers zero to i, inclusive, and that for each OLS all layers are considered as output layers. This supports scalability as the decoder can receive and decode all layers in a particular OLS. Since all layers are output layers, the decoder can select and render desired output layers. In this way, the total number of layers encoded may not have an effect on the decoding process and the error may be avoided while still providing scalable multiview video. As such, the disclosed mechanisms increase the functionality of an encoder and/or a decoder. Further, the disclosed mechanisms may decrease bitstream size, and hence reduce processor, memory, and/or network resource utilization at both the encoder and the decoder. In a particular embodiment, employing ols_mode_idc provides bit savings in encoded bitstreams that contain multiple OLSs, among which many data are shared, thus providing savings in steaming servers and providing bandwidth savings for transmitting such bitstreams. For example, the benefit of setting the ols_mode_idc to one is to support use cases such as multiview applications, wherein two or more views, each represented by one layer, are to be output and displayed simultaneously.

Optionally, in any of the preceding aspects, another implementation of the aspect provides, wherein the decoder is further configured to perform the method of any of the preceding aspects.

In an embodiment, the disclosure includes an encoder comprising: an encoding means for: encoding a bitstream comprising one or more OLSs including one or more layers of coded pictures; and encoding into the bitstream a VPS, wherein the VPS includes an ols_mode_idc specifying that for each OLS, all layers in the each OLS are output layers; and a storing means for storing the bitstream for communication toward a decoder.

Some video coding systems are configured to only decode and output the highest encoded layer as denoted by a layer ID along with one or more indicated lower layers. This can present a problem for scalability, because a decoder may not wish to decode the highest layer. Specifically, a decoder generally requests the highest layer that the decoder can support, but the decoder is generally unable to decode a layer that is higher than the requested layer. As a specific example, a decoder may wish to receive and decode a third layer out of fifteen total encoded layers. The third layer can be sent to the decoder without layers four through fifteen as such layers are not needed to decode the third layer. But the decoder may be unable to properly decode and display the third layer because the highest layer (layer fifteen) is not present and the video system is directed to always decode and display the highest layer. This results in an error when video scalability is attempted in such systems. This may be a significant problem because requiring that decoders always support the highest layer results in a system that cannot scale to intermediate layers based on different hardware and network requirements. This issue is compounded when multiview is employed. In multiview, more than one layer is output for display. For example, a user may employ a headset and different layers may be displayed to each eye to create the impression of three dimensional (3D) video. Systems that fail to support scalability also fail to support multiview scalability.

The present example includes a mechanism to support multiview scalability. The layers are included in OLSs. The encoder can send an OLS containing the layers to scale to a particular characteristic, such as size or SNR. Further, the encoder may transmit an ols_mode_idc syntax element, for example in a VPS. The ols_mode_idc syntax element can be set to one to indicate the use of multiview scalability. For example, the ols_mode_idc can indicate that a total number of OLSs is equal to the total number of layers specified in the VPS, that an i-th OLS includes layers zero to i, inclusive, and that for each OLS all layers are considered as output layers. This supports scalability as the decoder can receive and decode all layers in a particular OLS. Since all layers are output layers, the decoder can select and render desired output layers. In this way, the total number of layers encoded may not have an effect on the decoding process and the error may be avoided while still providing scalable multiview video. As such, the disclosed mechanisms increase the functionality of an encoder and/or a decoder. Further, the disclosed mechanisms may decrease bitstream size, and hence reduce processor, memory, and/or network resource utilization at both the encoder and the decoder. In a particular embodiment, employing ols_mode_idc provides bit savings in encoded bitstreams that contain multiple OLSs, among which many data are shared, thus providing savings in steaming servers and providing bandwidth savings for transmitting such bitstreams. For example, the benefit of setting the ols_mode_idc to one is to support use cases such as multiview applications, wherein two or more views, each represented by one layer, are to be output and displayed simultaneously.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
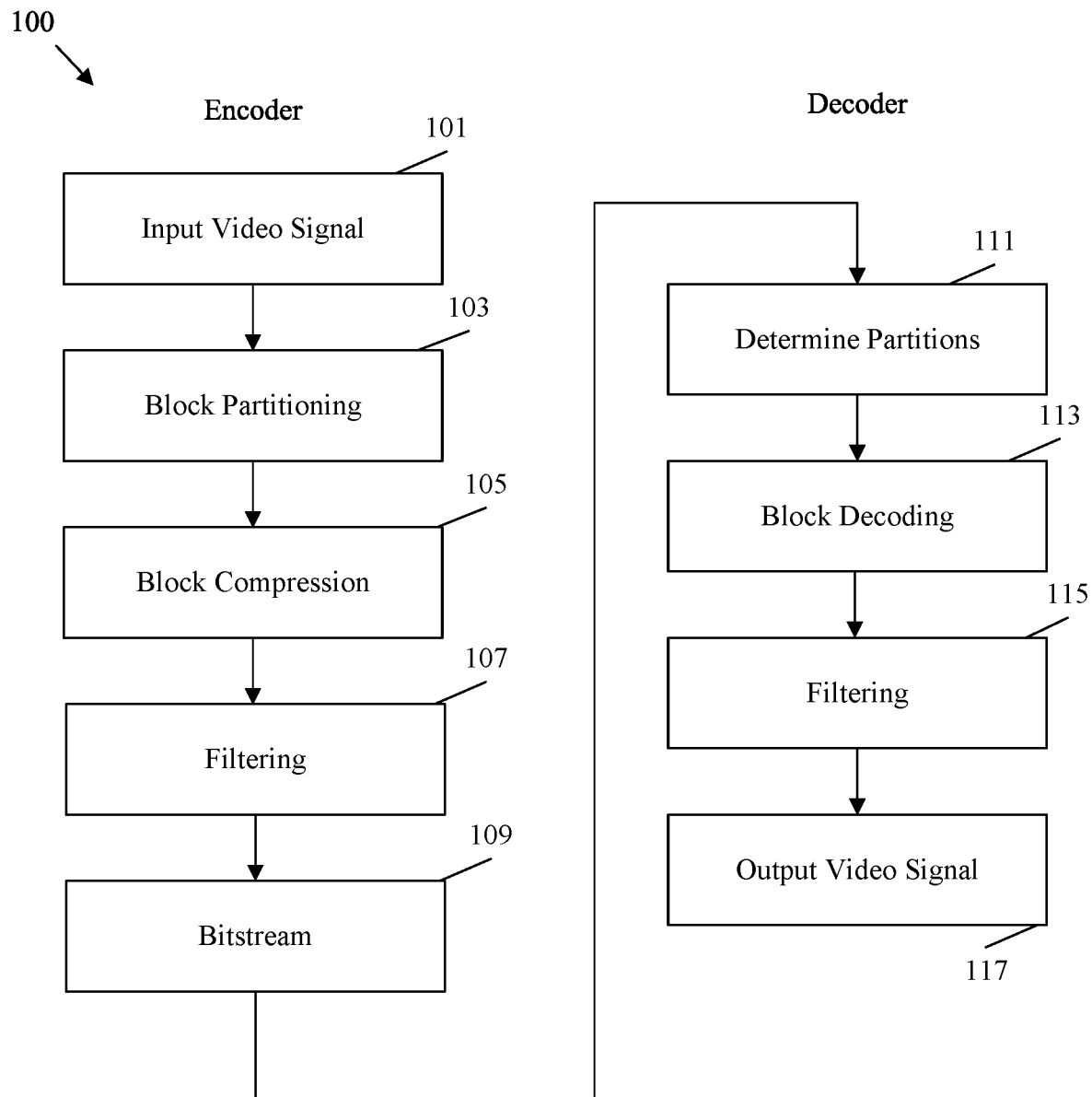
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion.

A network abstraction layer (NAL) unit is a syntax structure containing data in the form of a Raw Byte Sequence Payload (RBSP), an indication of the type of data, and interspersed as desired with emulation prevention bytes. A video coding layer (VCL) NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. A layer is a set of VCL NAL units that share a specified characteristic (e.g., a common resolution, frame rate, image size, etc.) and associated non-VCL NAL units. The VCL NAL units of a layer may share a particular value of a NAL unit header layer identifier (nuh_layer_id). A coded picture is a coded representation of a picture comprising VCL NAL units with a particular value of a NAL unit header layer identifier (nuh_layer_id) within an access unit (AU) and containing all coding tree units (CTUs) of the picture. A decoded picture is a picture produced by applying a decoding process to a coded picture. A coded video sequence (CVS) is a sequence of AUs that include, in decoding order, one or more coded video sequence start (CVSS) AUs and optionally one more AUs that are not CVSS AUs. A CVSS AU is an AU including a prediction unit (PU) for each layer specified by the video parameter set (VPS), where a coded picture in each PU is a starting picture for a CVS/coded layer video sequence (CLVS).

An output layer set (OLS) is a set of layers for which one or more layers are specified as output layer(s). An output layer is a layer that is designated for output (e.g., to a display). A highest layer is a layer in an OLS that has a largest layer indentifier (ID) of all layers in the OLS. In some example OLS modes, the highest layer may always be an output layer. In other modes, indicated layers and/or all layers are output layers. A video parameter set (VPS) is a data unit that contains parameters related to an entire video. Inter-layer prediction is a mechanism of coding a current picture in a current layer by reference to a reference picture in a reference layer, where the current picture and the reference picture are included in the same AU and the reference layer includes a lower nuh_layer_id than the current layer.

An OLS mode identification code (ols_mode_idc) is a syntax element that indicates information related to the number of OLSs, the layers of the OLSs, and the output layers in the OLS s. A VPS maximum layers minus one (vps_max_layers_minus1) is a syntax element that signals the number of layers specified by a VPS, and hence the maximum number of layers allowed in a corresponding CVS. An each layer is an OLS flag (each_layer_is_an_ols_flag) is a syntax element that signals whether each OLS in a bitstream contains a single layer. A total number of OLSs (TotalNumOLss) is a variable specifying the total number of OLSs specified by the VPS. A number of layers in an i-th OLS (NumLayersInOLS[i]) is a variable that specifies the number of layers in the in a particular OLS denoted by an OLS index value of i. A layer ID in an OLS (LayerIdInOLS[i][j]) is a variable that specifies the nuh_layer_id value of the j-th layer in the i-th OLS denoted by a layer index j and an OLS index i. A vps_layer_id[i] is a syntax element that indicates a layer ID of an i-th layer.

The following acronyms are used herein, Coding Tree Block (CTB), Coding Tree Unit (CTU), Coding Unit (CU), Coded Video Sequence (CVS), Joint Video Experts Team (JVET), Motion Constrained Tile Set (MCTS), Maximum Transfer Unit (MTU), Network Abstraction Layer (NAL), Output Layer Set (OLS), Picture Order Count (POC), Raw Byte Sequence Payload (RBSP), Sequence Parameter Set (SPS), Video Parameter Set (VPS), and Versatile Video Coding (VVC).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a WD, which includes JVET-O2001-v14.

Layers of pictures can be employed to support scalability. For example, a video can be coded into multiple layers. A layer may be coded without referencing other layers. Such a layer is referred to as a simulcast layer. Accordingly, a simulcast layer can be decoded without reference to other layers. As another example, a layer can be coded using inter-layer prediction. This allows a current layer to be coded by including only the differences between the current layer and a reference layer. For example, a current layer and a reference layer may contain the same video sequence coded by varying a characteristic, such as signal to noise ratio (SNR), picture size, frame rate, etc.

Some video coding systems are configured to only decode and output the highest encoded layer as denoted by a layer identifier (ID) along with one or more indicated lower layers. This can present a problem for scalability, because a decoder may not wish to decode the highest layer. Specifically, a decoder generally requests the highest layer that the decoder can support, but the decoder is generally unable to decode a layer that is higher than the requested layer. As a specific example, a decoder may wish to receive and decode a third layer out of fifteen total encoded layers. The third layer can be sent to the decoder without layers four through fifteen as such layers are not needed to decode the third layer. But the decoder may be unable to properly decode and display the third layer because the highest layer (layer fifteen) is not present and the video system is directed to always decode and display the highest layer. This results in an error when video scalability is attempted in such systems. This may be a significant problem because requiring that decoders always support the highest layer results in a system that cannot scale to intermediate layers based on different hardware and network requirements. This issue is compounded when multiview is employed. In multiview, more than one layer is output for display. For example, a user may employ a headset and different layers may be displayed to each eye to create the impression of three dimensional (3D) video. Systems that fail to support scalability also fail to support multiview scalability.

Disclosed herein is a mechanism to support multiview scalability. The layers are included in output layer sets (OLSs). The encoder can send an OLS containing the layers to scale to a particular characteristic, such as size or SNR. Spatial scalability allows a video sequence to be coded into layers such that the layers are placed in into OLSs so that each OLS contains sufficient data to decode the video sequence to a corresponding output screen size. So spatial scalability may include a set of layer(s) to decode video for a smartphone screen, a set of layers to decode video for a large television screen, and sets of layers for intermediate screen sizes. SNR scalability allows a video sequence to be coded into layers such that the layers are placed in into OLSs so that each OLS contains sufficient data to decode the video sequence at a different SNR. So SNR scalability may include a set of layers that may be decoded for low quality video, high quality video, and various intermediate video qualities based on network conditions. Further, the encoder may transmit an OLS mode identification code (ols_mode_idc) syntax element, for example in a video parameter set (VPS). The ols_mode_idc syntax element can be set to one to indicate the use of multiview scalability. For example, the ols_mode_idc can indicate that a total number of OLSs is equal to the total number of layers specified in the VPS, that an i-th OLS includes layers zero to i, inclusive, and that for each OLS all layers are considered as output layers. This supports scalability as the decoder can receive and decode all layers in a particular OLS. Since all layers are output layers, the decoder can select and render desired output layers. In this way, the total number of layers encoded may not have an effect on the decoding process and the error may be avoided while still providing scalable multiview video. As such, the disclosed mechanisms increase the functionality of an encoder and/or a decoder. Further, the disclosed mechanisms may decrease bitstream size, and hence reduce processor, memory, and/or network resource utilization at both the encoder and the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
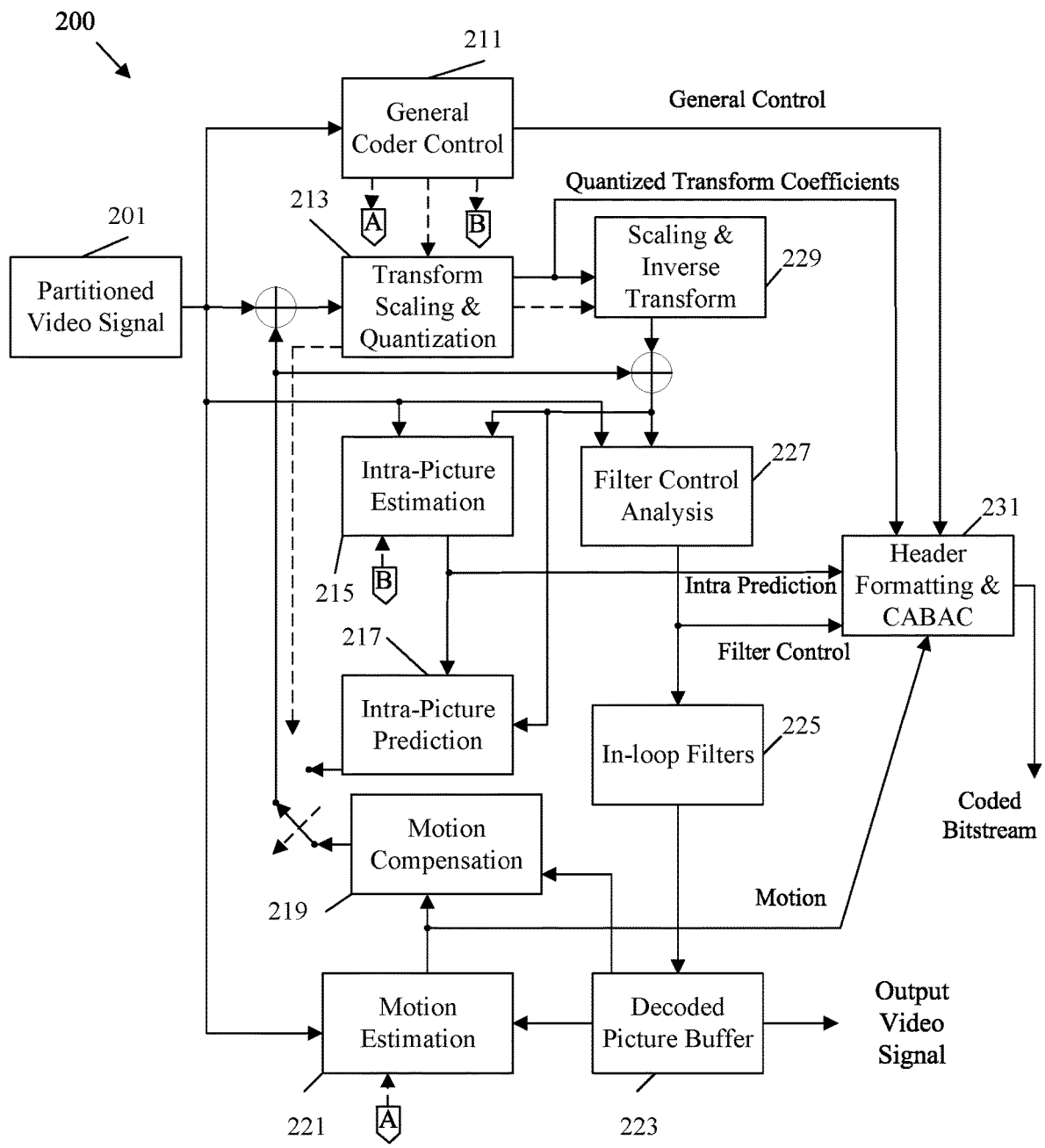
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
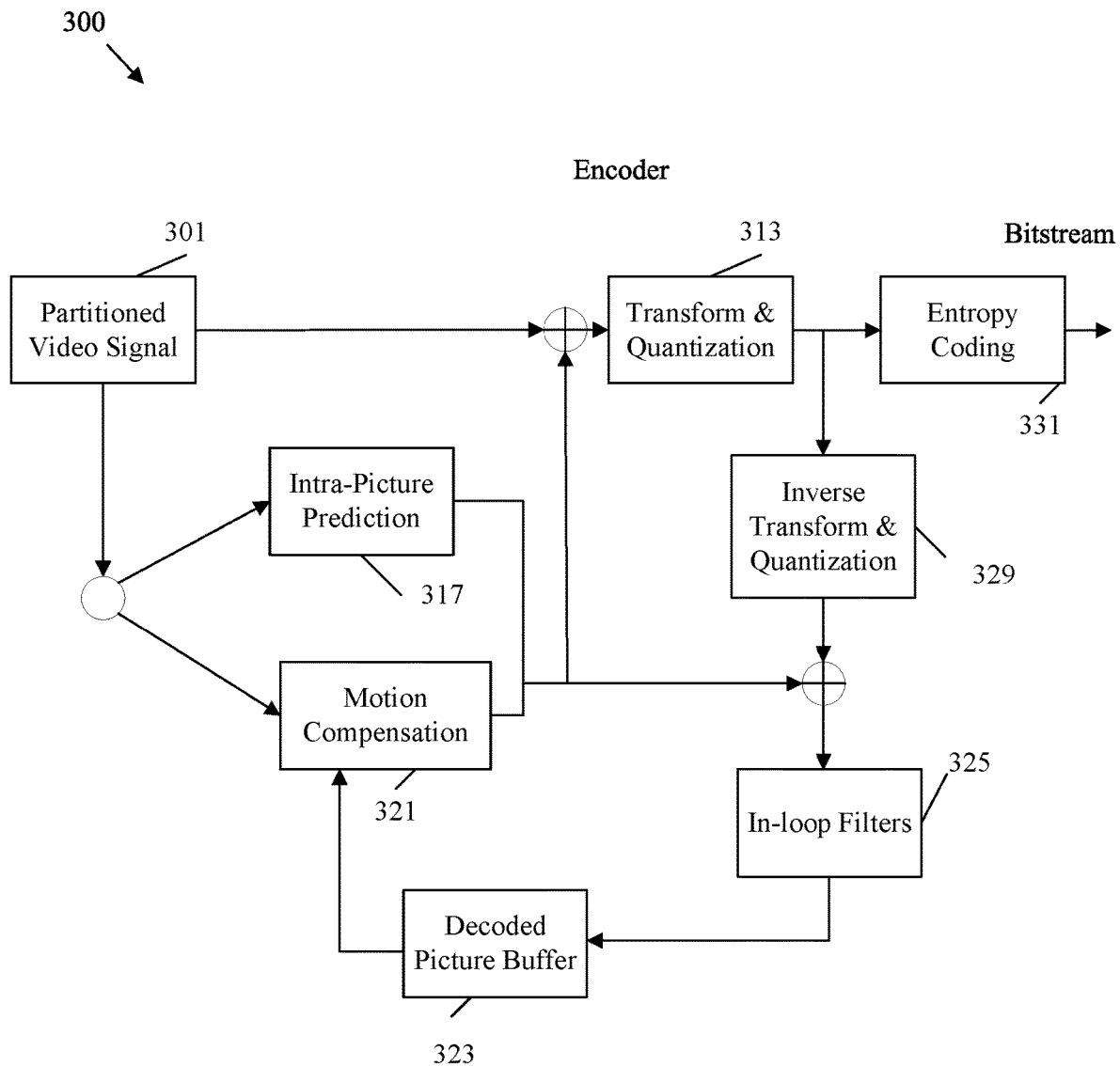
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
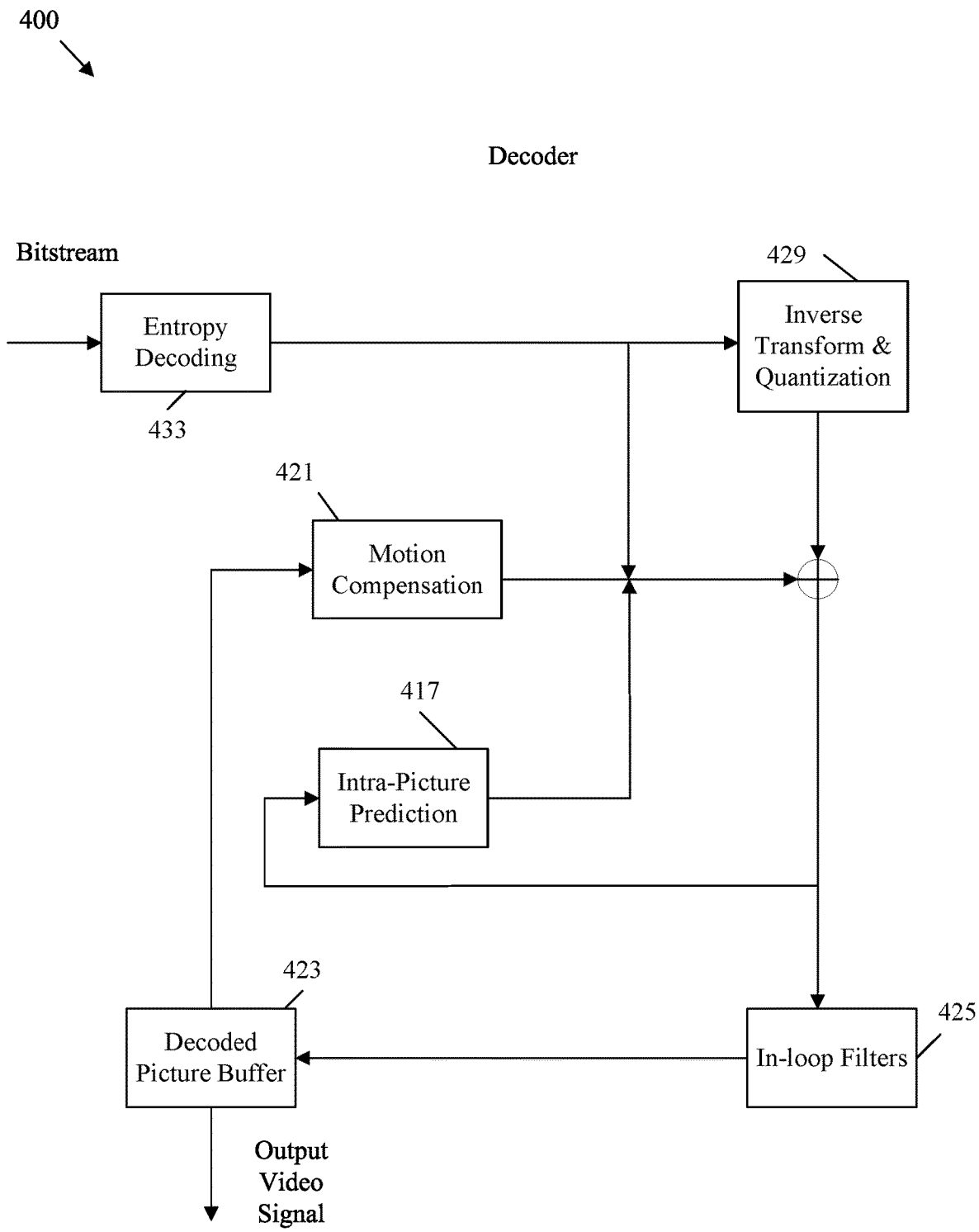
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
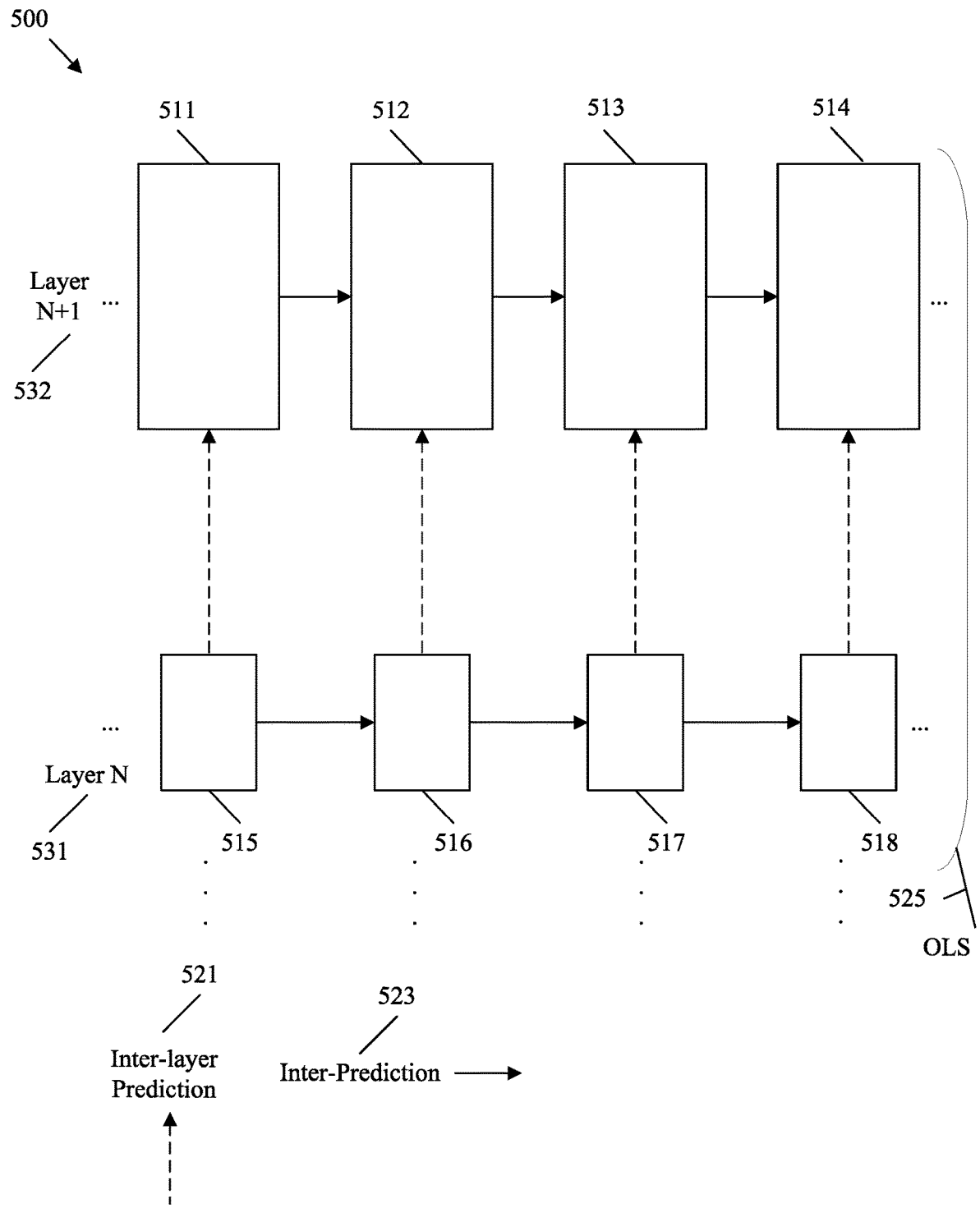
FIG. 5 is a schematic diagram illustrating an example multi-layer video sequence configured for inter-layer prediction.

FIG. 5 is a schematic diagram illustrating an example multi-layer video sequence 500 configured for inter-layer prediction 521. The multi-layer video sequence 500 may be encoded by an encoder, such as codec system 200 and/or encoder 300 and decoded by a decoder, such as codec system 200 and/or decoder 400, for example according to method 100. The multi-layer video sequence 500 is included to depict an example application for layers in a coded video sequence. A multi-layer video sequence 500 is any video sequence that employs a plurality of layers, such as layer N 531 and layer N+1 532.

In an example, the multi-layer video sequence 500 may employ inter-layer prediction 521. Inter-layer prediction 521 is applied between pictures 511, 512, 513, and 514 and pictures 515, 516, 517, and 518 in different layers. In the example shown, pictures 511, 512, 513, and 514 are part of layer N+1 532 and pictures 515, 516, 517, and 518 are part of layer N 531. A layer, such as layer N 531 and/or layer N+1 532, is a group of pictures that are all associated with a similar value of a characteristic, such as a similar size, quality, resolution, signal to noise ratio, capability, etc. A layer may be defined formally as a set of VCL NAL units and associated non-VCL NAL units that share the same nuh_layer_id. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations.

In the example shown, layer N+1 532 is associated with a larger image size than layer N 531. Accordingly, pictures 511, 512, 513, and 514 in layer N+1 532 have a larger picture size (e.g., larger height and width and hence more samples) than pictures 515, 516, 517, and 518 in layer N 531 in this example. However, such pictures can be separated between layer N+1 532 and layer N 531 by other characteristics. While only two layers, layer N+1 532 and layer N 531, are shown, a set of pictures can be separated into any number of layers based on associated characteristics. Layer N+1 532 and layer N 531 may also be denoted by a layer ID. A layer ID is an item of data that is associated with a picture and denotes the picture is part of an indicated layer. Accordingly, each picture 511-518 may be associated with a corresponding layer ID to indicate which layer N+1 532 or layer N 531 includes the corresponding picture. For example, a layer ID may include a NAL unit header layer identifier (nuh_layer_id), which is a syntax element that specifies an identifier of a layer that includes a NAL unit (e.g., that include slices and/or parameters of the pictures in a layer). A layer associated with a lower quality/bitstream size, such as layer N 531, is generally assigned a lower layer ID and is referred to as a lower layer. Further, a layer associated with a higher quality/bitstream size, such as layer N+1 532, is generally assigned a higher layer ID and is referred to as a higher layer.

Pictures 511-518 in different layers 531-532 are configured to be displayed in the alternative. As a specific example, a decoder may decode and display picture 515 at a current display time if a smaller picture is desired or the decoder may decode and display picture 511 at the current display time if a larger picture is desired. As such, pictures 511-514 at higher layer N+1 532 contain substantially the same image data as corresponding pictures 515-518 at lower layer N 531 (notwithstanding the difference in picture size). Specifically, picture 511 contains substantially the same image data as picture 515, picture 512 contains substantially the same image data as picture 516, etc.

Pictures 511-518 can be coded by reference to other pictures 511-518 in the same layer N 531 or N+1 532. Coding a picture in reference to another picture in the same layer results in inter-prediction 523. Inter-prediction 523 is depicted by solid line arrows. For example, picture 513 may be coded by employing inter-prediction 523 using one or two of pictures 511, 512, and/or 514 in layer N+1 532 as a reference, where one picture is referenced for unidirectional inter-prediction and/or two pictures are referenced for bidirectional inter-prediction. Further, picture 517 may be coded by employing inter-prediction 523 using one or two of pictures 515, 516, and/or 518 in layer N 531 as a reference, where one picture is referenced for unidirectional inter-prediction and/or two pictures are referenced for bidirectional inter-prediction. When a picture is used as a reference for another picture in the same layer when performing inter-prediction 523, the picture may be referred to as a reference picture. For example, picture 512 may be a reference picture used to code picture 513 according to inter-prediction 523. Inter-prediction 523 can also be referred to as intra-layer prediction in a multi-layer context. As such, inter-prediction 523 is a mechanism of coding samples of a current picture by reference to indicated samples in a reference picture that is different from the current picture where the reference picture and the current picture are in the same layer.

Pictures 511-518 can also be coded by reference to other pictures 511-518 in different layers. This process is known as inter-layer prediction 521, and is depicted by dashed arrows. Inter-layer prediction 521 is a mechanism of coding samples of a current picture by reference to indicated samples in a reference picture where the current picture and the reference picture are in different layers and hence have different layer IDs. For example, a picture in a lower layer N 531 can be used as a reference picture to code a corresponding picture at a higher layer N+1 532. As a specific example, picture 511 can be coded by reference to picture 515 according to inter-layer prediction 521. In such a case, the picture 515 is used as an inter-layer reference picture. An inter-layer reference picture is a reference picture used for inter-layer prediction 521. In most cases, inter-layer prediction 521 is constrained such that a current picture, such as picture 511, can only use inter-layer reference picture(s) that are included in the same AU and that are at a lower layer, such as picture 515. An AU is a set of pictures associated with a particular output time in a video sequence, and hence an AU can include as many as one picture per layer. When multiple layers (e.g., more than two) are available, inter-layer prediction 521 can encode/decode a current picture based on multiple inter-layer reference picture(s) at lower levels than the current picture.

A video encoder can employ a multi-layer video sequence 500 to encode pictures 511-518 via many different combinations and/or permutations of inter-prediction 523 and inter-layer prediction 521. For example, picture 515 may be coded according to intra-prediction. Pictures 516-518 can then be coded according to inter-prediction 523 by using picture 515 as a reference picture. Further, picture 511 may be coded according to inter-layer prediction 521 by using picture 515 as an inter-layer reference picture. Pictures 512-514 can then be coded according to inter-prediction 523 by using picture 511 as a reference picture. As such, a reference picture can serve as both a single layer reference picture and an inter-layer reference picture for different coding mechanisms. By coding higher layer N+1 532 pictures based on lower layer N 531 pictures, the higher layer N+1 532 can avoid employing intra-prediction, which has much lower coding efficiency than inter-prediction 523 and inter-layer prediction 521. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

In order to perform such operations, layers such as layer N 531 and layer N+1 532 may be included in an OLS 525. An OLS 525 is a set of layers for which one or more layers are specified as an output layer. An output layer is a layer that is designated for output (e.g., to a display). For example, layer N 531 may be included solely to support inter-layer prediction 521 and may never be output. In such a case, layer N+1 532 is decoded based on layer N 531 and is output. In such a case, the OLS 525 includes layer N+1 532 as the output layer. An OLS 525 may contain many layers in different combinations. For example, an output layer in an OLS 525 can be coded according to inter-layer prediction 521 based on a one, two, or many lower layers. Further, an OLS 525 may contain more than one output layer. Hence, an OLS 525 may contain one or more output layers and any supporting layers needed to reconstruct the output layers. A multi-layer video sequence 500 can be coded by employing many different OLSs 525 that each employ different combinations of the layers.

As a specific example, inter-layer prediction 521, may be employed to support scalability. For example, a video can be coded into a base layer, such as layer N 531, and several enhancement layers, such as layer N+1 532, a layer N+2, a layer N+3, etc., that are coded according to inter-layer prediction 521. A video sequence can be coded for several scalable characteristics, such as signal to noise ration (SNR), frame rate, picture size, etc. An OLS 525 can then be created for each allowable characteristic. For example an OLS 525 for a first resolution may include only Layer N 531, an OLS 525 for a second resolution may include layer N 531 and layer N+1 532, an OLS for a third resolution may include layer N 531, layer N+1 532, a layer N+2, etc. In this way, an OLS 525 can be transmitted to allow a decoder to decode whichever version of the multi-layer video sequence 500 is desired based on network conditions, hardware constraints, etc.

Figure 6:
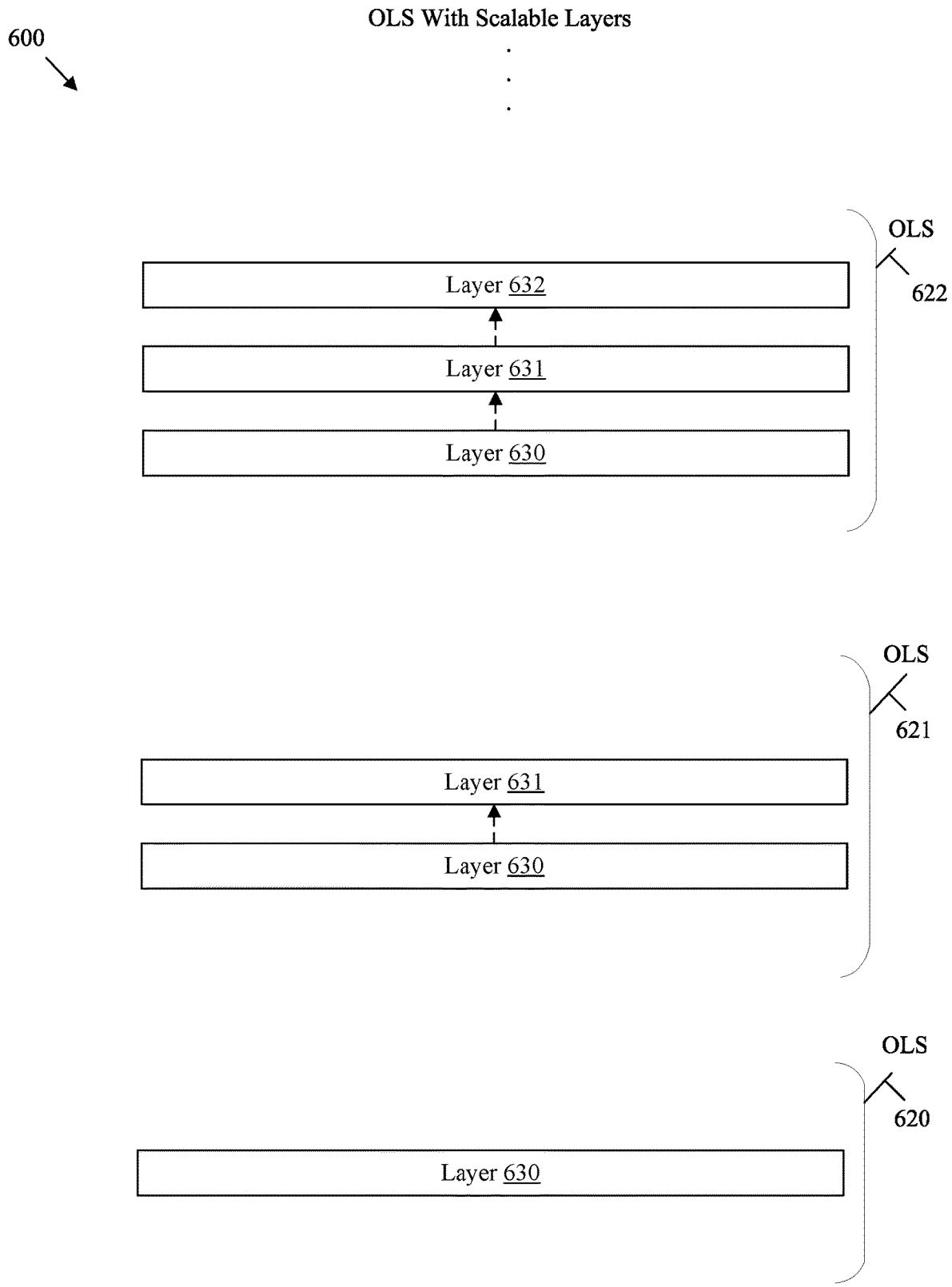
FIG. 6 is a schematic diagram illustrating an example video sequence with OLSs configured for multiview scalability.

FIG. 6 is a schematic diagram illustrating an example video sequence 600 with OLSs configured for multiview scalability. The video sequence 600 is a specific example of a multi-layer video sequence 500. As such, the video sequence 600 can be encoded by an encoder, such as codec system 200 and/or encoder 300 and decoded by a decoder, such as codec system 200 and/or decoder 400, for example according to method 100. The video sequence 600 is useful for scalability.

The example video sequence 600 includes OLS 620, OLS 621, and OLS 622, which may be substantially similar to OLS 525. While three OLSs are depicted any number of OLSs may be employed. Each OLS 620, 621, and 622 is referenced by an OLS index and includes one or more layers. Specifically, OLS 620, 621, and 622 include layer 630, layers 630 and 631, and layers 630, 631, and 632, respectively. Layers 630, 631, and 632, may be substantially similar to layer N 531 and layer N+1 532. The layers 630, 631, and 632, are referenced by a layer index. The video sequence 600 includes the same number of layers as the number of OLSs. Specifically, the OLS 620 with the lowest OLS index contains the layer 630 with the lowest layer index. Each other OLS includes all layers of the preceding OLS with a lower OLS index plus one. For example, OLS 621 has a higher OLS index than OLS 620 and contains layers 630 and 631, which are all of the layers of OLS 620 plus one. Likewise, OLS 622 has a higher OLS index than OLS 621 and contains layers 630, 631, and 632 which are all of the layers of OLS 621 plus one. This pattern may continue until the layer with the highest layer index and the OLS with the highest OLS index are reached.

Further, layer 630 is a base layer. All other layers 631 and 632 are enhancement layers that are coded according to inter-layer prediction based on all layers with lower layer indices. Specifically, layer 630 is a base layer and is not coded according to inter-layer prediction. Layer 631 is an enhancement layer that is coded according to inter-layer prediction based on layer 630. Further, layer 632 is an enhancement layer that is coded according to inter-layer prediction based on layer 630 and 631. The result is that OLS 620 contains the layer 630 with the lowest quality SNR and/or smallest image size. Since OLS 620 does not employ any inter-layer prediction, OLS 620 can be completely decoded without reference to any layer but layer 630. OLS 621 contains layer 631 which has a higher quality SNR and/or image size than layer 630, and layer 631 can be completely decoded according to inter-layer prediction because the OLS 621 also contains layer 630. Likewise, OLS 622 contains layer 632 which has a higher quality SNR and/or image size than layers 630 and 631, and layer 632 can be completely decoded according to inter-layer prediction because the OLS 622 also contains layers 630 and 631. Accordingly, the video sequence 600 is coded to scale to any preselected SNR and/or image size by sending a corresponding OLS 622, 621, or 620 to a decoder. When more OLSs 622, 621, and 620 are employed, the video sequence 600 can scale to more SNR image qualities and/or images sizes.

Accordingly, the video sequence 600 can support spatial scalability. Spatial scalability allows a video sequence 600 to be coded into layers 630, 631, and 632 such that the layers 630, 631, and 632 are placed in into OLSs 620, 621, and 622 so that each OLS 620, 621, and 622 contains sufficient data to decode the video sequence 600 to a corresponding output screen size. So spatial scalability may include a set of layer(s) (e.g., layer 630) to decode video for a smartphone screen, a set of layers to decode video for a large television screen (e.g., layers 630, 631, and 632), and sets of layers (e.g., layers 630 and 631) for intermediate screen sizes. SNR scalability allows a video sequence 600 to be coded into layers 630, 631, and 632 such that the layers 630, 631, and 632 are placed in into OLSs 620, 621, and 622 so that each OLS 620, 621, and 622 contains sufficient data to decode the video sequence 600 at a different SNR. So SNR scalability may include a set of layer(s) (e.g., layer 630) that may be decoded for low quality video, high quality video (e.g., layers 630, 631, and 632), and various intermediate video qualities (e.g., layers 630 and 631) to support different network conditions.

The present disclosure provides efficient signaling to allow a video sequence 600 with multiview layers to be correctly and efficiently employed. As an example, the layers 630, 631, and 632 may all be designated as output layers. The decoder can then select and render the layers 630, 631, and 632 as desired to implement multiview. In order to support this implementation, the coding of the video sequence 600 may be denoted according to an ols_mode_idc syntax element. For example, ols_mode_idc syntax element may identify the video sequence 600 as OLS mode one. Hence, the ols_mode_idc syntax element can be set to one and signaled in a bitstream to indicate that video sequence 600 is employed. Accordingly, the decoder can receive any OLS and can determine, based on ols_mode_idc, that the number of OLSs 620, 621, and 622 is the same as the number of layers 630, 631, and 632, that a current OLS ID of i indicates that the current OLS contains a set layers with IDs from zero to i, and that all layers in the current OLS are output layers. The decoder can then decode and display the layers 630, 631, and/or 632 from the OLS 620, 621, and/or 622 as desired to implement multiview.

Figure 7:
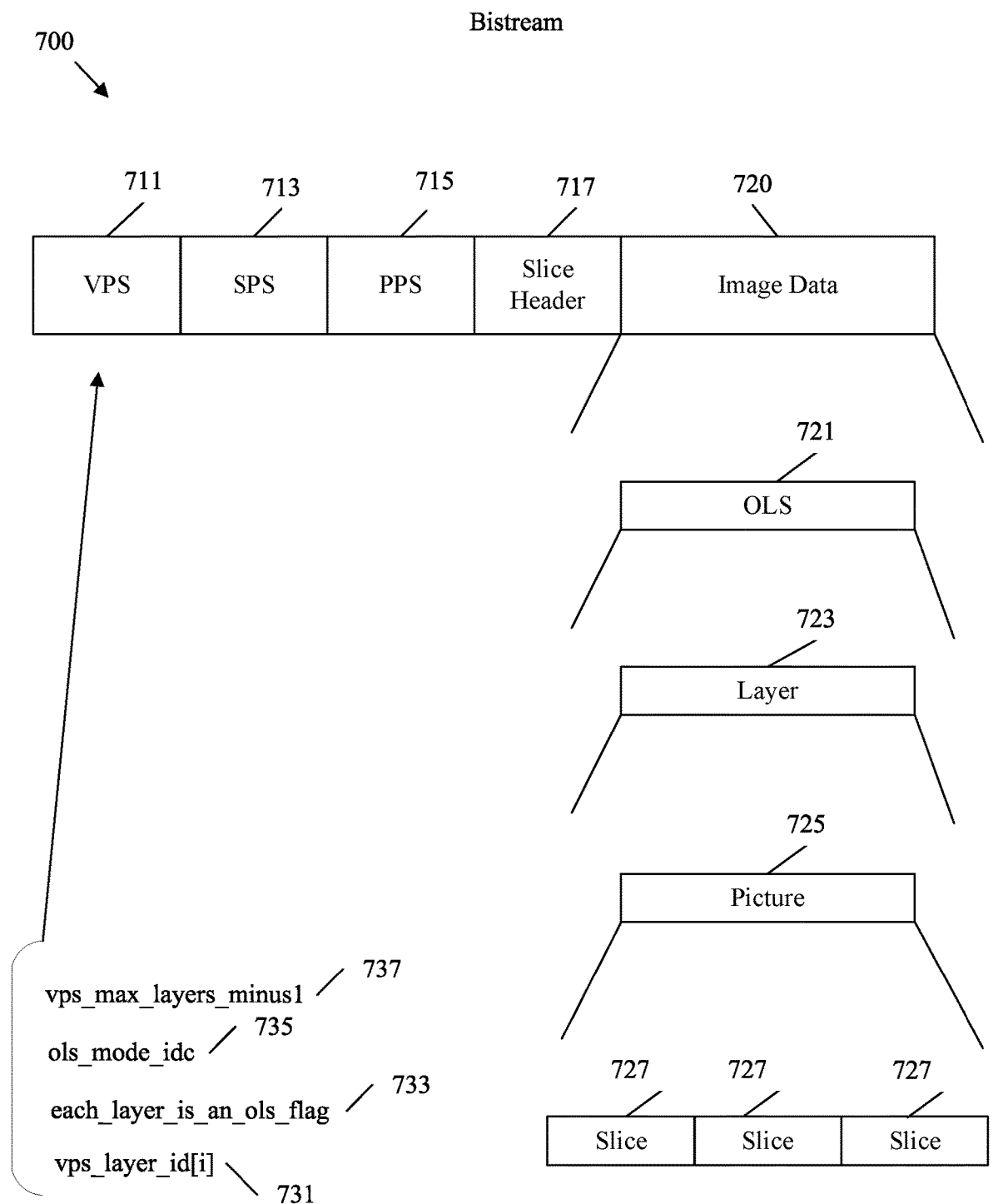
FIG. 7 is a schematic diagram illustrating an example bitstream including OLSs configured for multiview scalability.

FIG. 7 is a schematic diagram illustrating an example bitstream 700 including OLSs configured for multiview scalability. For example, the bitstream 700 can be generated by a codec system 200 and/or an encoder 300 for decoding by a codec system 200 and/or a decoder 400 according to method 100. Further, the bitstream 700 may include a coded multi-layer video sequence 500 and/or video sequence 600.

The bitstream 700 includes a VPS 711, one or more Sequence Parameter Sets (SPSs) 713, a plurality of picture parameter sets (PPSs) 715, a plurality of slice headers 717, and image data 720. A VPS 711 contains data related to the entire bitstream 700. For example, the VPS 711 may contain data related OLSs, layers, and/or sublayers used in the bitstream 700. An SPS 713 contains sequence data common to all pictures in a coded video sequence contained in the bitstream 700. For example, each layer may contain one or more coded video sequences, and each coded video sequence may reference a SPS 713 for corresponding parameters. The parameters in a SPS 713 can include picture sizing, bit depth, coding tool parameters, bit rate restrictions, etc. It should be noted that, while each sequence refers to a SPS 713, a single SPS 713 can contain data for multiple sequences in some examples. The PPS 715 contains parameters that apply to an entire picture. Hence, each picture in the video sequence may refer to a PPS 715. It should be noted that, while each picture refers to a PPS 715, a single PPS 715 can contain data for multiple pictures in some examples. For example, multiple similar pictures may be coded according to similar parameters. In such a case, a single PPS 715 may contain data for such similar pictures. The PPS 715 can indicate coding tools available for slices in corresponding pictures, quantization parameters, offsets, etc.

The slice header 717 contains parameters that are specific to each slice 727 in a picture 725. Hence, there may be one slice header 717 per slice 727 in the video sequence. The slice header 717 may contain slice type information, POCs, reference picture lists, prediction weights, tile entry points, deblocking parameters, etc. It should be noted that in some examples, a bitstream 700 may also include a picture header, which is a syntax structure that contains parameters that apply to all slices 727 in a single picture. For this reason, a picture header and a slice header 717 may be used interchangeably in some contexts. For example, certain parameters may be moved between the slice header 717 and a picture header depending on whether such parameters are common to all slices 727 in a picture 725.

The image data 720 contains video data encoded according to inter-prediction and/or intra-prediction as well as corresponding transformed and quantized residual data. For example, the image data 720 may include layers 723 of pictures 725. The layers 723 may be organized into OLSs 721. An OLS 721 may be substantially similar to OLS 525, 620, 621, and/or 622. Specifically, an OLS 721 is a set of layers for 723 which one or more layers 723 are specified as output layer(s). When the layers 723 include multiview video, all of the layers 723 may be specified as output layers. For example, a bitstream 700 may be coded to include several OLSs 721 with video coded at different resolutions, frame rates, picture 725 sizes, etc. Upon request by a decoder, a sub-bitstream extraction process can remove all but a requested OLS 721 from the bitstream 700. The encoder can then transmit the bitstream 700 containing only the requested OLS 721, and hence only video that meets requested criteria, to the decoder.

A layer 723 may be substantially similar to a layer N 531, a layer N+1 532, and/or layers 631, 632, and/or 633. A layer 723 is generally a set of encoded pictures 725. A layer 723 may be formally defined as a set of VCL NAL units that, when decoded, share a specified characteristic (e.g., a common resolution, frame rate, image size, etc.) A picture 725 may be coded as a set of VCL NAL units. A layer 723 also includes associated non-VCL NAL units to support decoding of the VCL NAL units. The VCL NAL units of a layer 723 may share a particular value of nuh_layer_id, which is an example layer ID. The layer 723 may be a simulcast layer that is coded without inter-layer prediction or a layer 723 that is coded according to inter-layer prediction based on other layers.

A picture 725 is an array of luma samples and/or an array of chroma samples that create a frame or a field thereof. For example, a picture 725 may be a coded image that may be output for display or used to support coding of other picture(s) 725 for output. A picture 725 may include a set of VCL NAL units. A picture 725 contains one or more slices 727. A slice 727 may be defined as an integer number of complete tiles or an integer number of consecutive complete coding tree unit (CTU) rows (e.g., within a tile) of a picture 725 that are exclusively contained in a single NAL unit, specifically a VCL NAL unit. The slices 727 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

The present disclosure includes mechanisms to support spatial and/or SNR scalability for multiview video, for example by employing a video sequence 600. For example, a VPS 711 may contain an ols_mode_idc 735. The ols_mode_idc 735 is a syntax element that indicates information related to the number of OLSs 721, the layers 723 of the OLSs 721, and the output layers 723 in the OLSs 721. An output layer 723 is any layer that is designated for output by a decoder as opposed to being used solely for reference based coding. The ols_mode_idc 735 may be set to zero or two for coding other types of video. The ols_mode_idc 735 can be set to one to spatial and/or SNR scalability for multiview video. For example, the ols_mode_idc 735 can be set to can be set to one to indicate that a total number of OLSs 721 in a video sequence is equal to the total number of layers 723 specified in the VPS 711, that an i-th OLS 721 includes layers zero to i, inclusive, and that for each OLS 721, all layers included in the OLS 721 are output layers. This series of conditions may describe video sequence 600 with any number of OLSs 721. The benefit of employing ols_mode_idc 735 is that ols_mode_idc 735 provides bit savings. A decoder in an application system generally only receives a single OLS. However, the ols_mode_idc 735 also provides bits savings in encoded bitstreams that contain multiple OLSs, among which many data are shared, thus providing savings in steaming servers and providing bandwidth savings for transmitting such bitstreams. Specifically, the benefit of setting the ols_mode_idc 735 to one is to support use cases such as multiview applications, wherein two or more views, each represented by one layer, are to be output and displayed simultaneously.

In some examples, the VPS 711 also includes a VPS maximum layers minus one (vps_max_layers_minus1) 737 syntax element. The vps_max_layers_minus1 737 is a syntax element that signals the number of layers 723 specified by a VPS 700, and hence the maximum number of layers 723 allowed in a corresponding coded video sequence in the bitstream 700. The ols_mode_idc 735 may reference the vps_max_layers_minus1 737 syntax element. For example, the ols_mode_idc 735 may indicate that the total number of OLSs 721 is equal to the number of layers 723 specified by the vps_max_layers_minus1 737.

Further, the VPS 711 may include an each 733. The each_layer_is_an_ols_flag 733 is a syntax element that signals whether each OLS 721 in a bitstream 700 contains a single layer 723. For example, each OLS 721 may contain a single simulcast layer when scalability is not used. Accordingly, the each_layer_is_an_ols_flag 733 can be set (e.g., to zero) to indicate that one or more OLSs 721 contain more than one layer 723 to support scalability. As such, the each_layer_is_an_ols_flag 733 can be used to support scalability. For example, the decoder can check the each_layer_is_an_ols_flag 733 to determine that some of the OLSs 721 include more than one layer 723. When the each_layer_is_an_ols_flag 733 is set to zero and when the ols_mode_idc 735 is set to one (or zero which is used for a different mode) the total number of OLSs (TotalNumOlss) can be set equal to vps_max_layers_minus1 737. The TotalNumOlss is a variable employed by both a decoder and a hypothetical reference decoder (HRD) at an encoder. The TotalNumOlss is a variable used to store the number of OLSs 721 based on the data in the bitstream 700. The TotalNumOlss can then be used for decoding at the decoder or checking for bitstream 700 errors at the HRD at the encoder.

The VPS 711 may also include a VPS layer identifier (vps_layer_id[i]) 731 syntax element. The vps_layer_id[i] 731 is an array that stores the layer IDs (e.g., nuh_layer_id) for each layer. Accordingly, the vps_layer_id[i] 731 indicates a layer ID of an i-th layer.

A decoder or a HRD may be capable of employing the data in the VPS 711 to determine the configuration of the OLSs 721 and the layers 723. In a specific example, a number of layers in an i-th OLS (NumLayersInOls[i]) and a layer ID in an OLS (LayerIdInOLS[i][j]) specifying a nuh_layer_id value of a j-th layer in the i-th OLS are derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc = = 0 | | ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
``` where vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer.

The data in the VPS 711 can be employed to support SNR and/or spatially scalable layers 723 including multiview video. The layers 723 can be encoded and included in OLSs 721. The encoder can transmit the bitstream 700 including a requested OLS 721 and the VPS 711 to a decoder. The decoder can then use the information in the VPS 711 to correctly decode the layers 723 in the OLS 721. This approach supports coding efficiency while supporting scalability. Specifically, the decoder can quickly determine the number of layers 723 in the OLS 721, determine that all of the layers in the OLS 721 are output layers, and decode the output layers according to inter-layer prediction. The decoder can then select the output layers that should be rendered to implement multiview. Accordingly, the decoder may receive the layers 723 needed to decode the views for multiview and the decoder can decode and display the pictures 725 from the layers 723 as desired. In this way, the total number of layers 723 encoded may not have an effect on the decoding process and one or more errors as discussed above may be avoided. As such, the disclosed mechanisms increase the functionality of an encoder and/or a decoder. Further, the disclosed mechanisms may decrease bitstream size, and hence reduce processor, memory, and/or network resource utilization at both the encoder and the decoder.

The preceding information is now described in more detail herein below. Layered video coding is also referred to as scalable video coding or video coding with scalability. Scalability in video coding may be supported by using multi-layer coding techniques. A multi-layer bitstream comprises a base layer (BL) and one or more enhancement layers (ELs). Example of scalabilities includes spatial scalability, quality/signal to noise ratio (SNR) scalability, multi-view scalability, frame rate scalability, etc. When a multi-layer coding technique is used, a picture or a part thereof may be coded without using a reference picture (intra-prediction), may be coded by referencing reference pictures that are in the same layer (inter-prediction), and/or may be coded by referencing reference pictures that are in other layer(s) (inter-layer prediction). A reference picture used for inter-layer prediction of the current picture is referred to as an inter-layer reference picture (ILRP). FIG. 5 illustrates an example of multi-layer coding for spatial scalability in which pictures in different layers have different resolutions.

Some video coding families provide support for scalability in separated profile(s) from the profile(s) for single-layer coding. Scalable video coding (SVC) is a scalable extension of the advanced video coding (AVC) that provides supports for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC may not directly reuse unmodified AVC implementations in their design. The SVC EL macroblock syntax and decoding process differ from AVC syntax and decoding process.

Scalable HEVC (SHVC) is an extension of HEVC that provides support for spatial and quality scalabilities. Multiview HEVC (MV-HEVC) is an extension of HEVC that provides support for multi-view scalability. 3D HEVC (3D-HEVC) is an extension of HEVC that provides support for 3D video coding that is more advanced and more efficient than MV-HEVC. Temporal scalability may be included as an integral part of a single-layer HEVC codec. In the multi-layer extension of HEVC, decoded pictures used for inter-layer prediction come only from the same AU and are treated as long-term reference pictures (LTRPs). Such pictures are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s). Spatial scalability resamples a reference picture or part thereof when an ILRP has a different spatial resolution than the current picture being encoded or decoded. Reference picture resampling can be realized at either picture level or coding block level.

VVC may also support layered video coding. A VVC bitstream can include multiple layers. The layers can be all independent from each other. For example, each layer can be coded without using inter-layer prediction. In this case, the layers are also referred to as simulcast layers. In some cases, some of the layers are coded using ILP. A flag in the VPS can indicate whether the layers are simulcast layers or whether some layers use ILP. When some layers use ILP, the layer dependency relationship among layers is also signaled in the VPS. Unlike SHVC and MV-HEVC, VVC may not specify OLSs. An OLS includes a specified set of layers, where one or more layers in the set of layers are specified to be output layers. An output layer is a layer of an OLS that is output. In some implementations of VVC, only one layer may be selected for decoding and output when the layers are simulcast layers. In some implementations of VVC, the entire bitstream including all layers is specified to be decoded when any layer uses ILP. Further, certain layers among the layers are specified to be output layers. The output layers may be indicated to be only the highest layer, all the layers, or the highest layer plus a set of indicated lower layers.

The preceding aspects contain certain problems. In some video coding systems when inter-layer prediction is employed, the entire bitstream and all layers are specified to be decoded and certain layers among the layers are specified to be output layers. The output layers may be indicated to be only the highest layer, all the layers, or the highest layer plus a set of indicated lower layers. For simplicity for describing the problem, two layers may be employed with an upper layer that uses the lower layer for inter-layer prediction reference. For multiview scalability, a system should specify the use of only the lower layer (decoding and output of the lower layer only). The system should also specify the use of both layers (decoding and output of both layers). Unfortunately, this is not possible is some video coding systems.

In general, this disclosure describes approaches for simple and efficient signaling of output layer sets (OLSs) for multiview scalability. The descriptions of the techniques are based on VVC by the JVET of ITU-T and ISO/IEC. However, the techniques also apply to layered video coding based on other video codec specifications.

One or more of the abovementioned problems may be solved as follows. Specifically, this disclosure includes a simple and efficient method for signaling of OLSs for spatial and SNR scalabilities. The video coding system may employ the VPS to indicate that some layers use ILP, that the total number of OLSs specified by the VPS is equal to the number of layers, that the i-th OLS includes the layers with layer indices from 0 to i, inclusive, and that for each OLS only the highest layer in the OLS is output.

An example implementation of the preceding mechanisms is as follows. An example video parameter set syntax is as follows.

|  | Descriptor |
| --- | --- |
| video_parameter_set_rbsp( ) { |  |
|   vps_video_parameter_set_id | u(4) |
|   vps_max_layers_minus1 | u(6) |
|   vps_max_sub_layers_minus1 | u(3) |
|   if( vps_max_layers_minus1 > 0 ) |  |
|     vps_all_independent_layers_flag | u(1) |
|   for( i = 0; i <= vps_max_layers_minus1; i++ ) { |  |
|     vps_layer_id[ i ] | u(6) |
|     if( i > 0 && !vps_all_independent_layers_flag ) { |  |
|       vps_independent_layer_flag[ i ] | u(1) |
|       if( !vps_independent_layer_flag[ i ] ) |  |
|         for( j =0; j < i; j++ ) |  |
|           vps_direct_dependency_flag[ i ][ j ] | u(1) |
|     } |  |
|   } |  |
|   if( vps_max_layers_minus1 > 0 ) { |  |
|     if( vps_all_independent_layers_flag ) |  |
|       each_layer_is_an_ols_flag | u(1) |
|     if( !each_layer_is_an_ols_flag ) { |  |
|       if( !vps_all_independent_layers_flag ) |  |
|         ols_mode_idc | u(2) |
|       if( ols_mode_idc = = 2 ) { |  |
|         num_output_layer_sets_minus1 | u(8) |
|         for( i = 1; i < num_output_layer_sets_minus1 + 1; i ++) { |  |
|           for( j = 0; j <= vps_max_layers_minus1; j++ ) |  |
|             layer_included_flag[ i ][ j ] | u(1) |
|           if( !vps_all_independent_layers_flag ) |  |
|             for( j = 0; j < NumLayersInOls[ i ] − 1; j++ ) |  |
|               vps_output_layer_flag[ i ][ j ] | u(1) |
|         } |  |
|       } |  |
|     } |  |
|   } |  |
|   vps_constraint_info_present_flag | u(1) |
|   vps_reserved_zero_7bits | u(7) |
|   if( vps_constraint_info_present_flag ) |  |
|     general_constraint_info( ) |  |
|   general_hrd_params_present_flag | u(1) |
|   if( general_hrd_params_present_flag ) { |  |
|     num_units_in_tick | u(32) |
|     time_scale | u(32) |
|     general_hrd_parameters( ) |  |
|   } |  |
|   vps_extension_flag | u(1) |
|   if( vps_extension_flag ) |  |
|     while( more_rbsp_data( ) ) |  |
|       vps_extension_data_flag | u(1) |
|   rbsp_trailing_bits( ) |  |
| } |  |

An example video parameter set semantics is as follows. A VPS RBSP should be available to the decoding process prior to being referenced, should be included in at least one access unit with a TemporalId equal to zero or provided through external mechanisms, and the VPS NAL unit containing the VPS RBSP should have nuh_layer_id equal to vps_layer_id[0]. All VPS NAL units with a particular value of vps_video_parameter_set_id in a CVS should have the same content. A vps_video_parameter_set_id provides an identifier for the VPS for reference by other syntax elements. A vps_max_layers_minus1 plus 1 specifies the maximum allowed number of layers in each CVS referring to the VPS. A vps_max_sub_layers_minus1 plus 1 specifies the maximum number of temporal sub-layers that may be present in each CVS referring to the VPS. The value of vps_max_sub_layers_minus1 should be in the range of zero to six, inclusive.

A vps_all_independent_layers_flag may be set equal to one to specify that all layers in the CVS are independently coded without using inter-layer prediction. A vps_all_independent_layers_flag may be set equal to zero to specify that one or more of the layers in the CVS may use inter-layer prediction. When not present, the value of vps_all_independent_layers_flag is inferred to be equal to one. When vps_all_independent_layers_flag is equal to one, the value of vps_independent_layer_flag[i] is inferred to be equal to one. When vps_all_independent_layers_flag is equal to zero, the value of vps_independent_layer_flag[0] is inferred to be equal to one. A vps_layer_id[i] specifies the nuh_layer_id value of the i-th layer. For any two non-negative integer values of m and n, when m is less than n, the value of vps_layer_id[m] should be less than vps_layer_id[n]. A vps_independent_layer_flag[i] may be set equal to one to specify that the layer with index i does not use inter-layer prediction. A vps_independent_layer_flag[i] may be set equal to zero to specify that the layer with index i may use inter-layer prediction and vps_layer_dependency_flag[i] is the present in VPS. When not present, the value of vps_independent_layer_flag[i] is inferred to be equal to one.

A vps_direct_dependency_flag[i][j] may be set equal to zero to specify that the layer with index j is not a direct reference layer for the layer with index i. A vps_direct_dependency_flag [i][j] may be set equal to one to specify that the layer with index j is a direct reference layer for the layer with index i. When vps_direct_dependency_flag[i][j] is not present for i and j in the range of zero to vps_max_layers_minus1, inclusive, the vps_direct_dependency_flag [i][j] is inferred to be equal to 0. The variable DirectDependentLayerIdx[i][j], specifying the j-th direct dependent layer of the i-th layer, is derived as follows:

```
for( i = 1; i < vps_max_layers_minus1; i++ )
    if( !vps_independent_layer_flag[ i ] )
        for( j = i, k = 0; j >= 0; j- - )
            if( vps_direct_dependency_flag[ i ][ j ] )
                DirectDependentLayerIdx[ i ][ k++ ] = j
```

The variable GeneralLayerIdx[i], specifying the layer index of the layer with nuh_layer_id equal to vps_layer_id [i], is derived as follows:
for(i=0; i<=vps_max_layers_minus1; i++)
GeneralLayerIdx[vps_layer_id[i]]=i An each_layer_is_an_ols_flag may be set equal to one to specify that each output layer set contains only one layer and each layer itself in the bitstream is an output layer set with the single included layer being the only output layer. The each_layer_is_an_ols_flag may be set equal to zero to specify that an output layer set may contain more than one layer. If vps_max_layers_minus1 is equal to zero, the value of each_layer_is_an_ols_flag is inferred to be equal to one. Otherwise, when vps_all_independent_layers_flag is equal to zero, the value of each_layer_is_an_ols_flag is inferred to be equal to zero.

An ols_mode_idc may be set equal to zero to specify that the total number of OLSs specified by the VPS is equal to vps_max_layers_minus1+1, the i-th OLS includes the layers with layer indices from zero to i, inclusive, and for each OLS only the highest layer in the OLS is output. The ols_mode_idc may be set equal to one to specify that the total number of OLSs specified by the VPS is equal to vps_max_layers_minus1+1, the i-th OLS includes the layers with layer indices from zero to i, inclusive, and for each OLS all layers in the OLS are output. The ols_mode_idc may be set equal to two to specify that the total number of OLSs specified by the VPS is explicitly signaled and for each OLS the highest layer and an explicitly signaled set of lower layers in the OLS are output. The value of ols_mode_idc should be in the range of zero to two, inclusive. The value three of ols_mode_idc is reserved. When vps_all_independent_layers_flag is equal to one and each_layer_is_an_ols_flag is equal to zero, the value of ols_mode_idc is inferred to be equal to two.

A num_output_layer_sets_minus1 plus 1 specifies the total number of OLSs specified by the VPS when ols_mode_idc is equal to two. The variable TotalNumOlss, specifying the total number of OLSs specified by the VPS, is derived as follows:

```
if( vps_max_layers_minus1 = = 0)
    TotalNumOlss = 1
else if( each_layer_is_an_ols_flag | | ols_mode_idc = = 0 | | ols_mode_idc = = 1 )
    TotalNumOlss = vps_max_layers_minus1 + 1
else if( ols_mode_idc = = 2)
    TotalNumOlss = num_output_layer_sets_minus1 + 1
```

A layer_included_flag[i][j] specifies whether the j-th layer (e.g., the layer with nuh_layer_id equal to vps_layer_id[j]) is included in the i-th OLS when ols_mode_idc is equal to two. The layer_included_flag[i][j] may be set equal to one to specify that the j-th layer is included in the i-th OLS. The layer_included_flag[i][j] may be set equal to zero to specify that the j-th layer is not included in the i-th OLS.

The variable NumLayersInOls[i], specifying the number of layers in the i-th OLS, and the variable LayerIdInOls[i][j], specifying the nuh_layer_id value of the j-th layer in the i-th OLS, may be derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
    if( each_layer_is_an_ols_flag ) 1
        NumLayersInOls[ i ] = 1
        LayerIdInOls[ i ][ 0 ] = vps_layer_id[ i ]
    } else if( ols_mode_idc = = 0 | | ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
    } else if( ols_mode_idc = = 2 ) {
        for( k = 0, j = 0; k <= vps_max_layers_minus1; k++ )
            if( layer_included_flag[ i ][ k ] )
```

```
        LayerIdInOls[ i ][ j++ ] = vps_layer_id[ k ]
    NumLayersInOls[ i ] = j
  }
}
```

The variable OlsLayeIdx[i][j], specifying the OLS layer index of the layer with nuh_layer_id equal to LayerIdInOls[i][j], may be derived as follows:

```
for( i = 0, i < TotalNumOlss; i++ )
    for j = 0; j < NumLayersInOls[ i ]; j++ )
        OlsLayeIdx[ i ][ LayerIdInOls[ i ][ j ] ] = j
```

The lowest layer in each OLS should be an independent layer. In other words, for each i in the range of zero to TotalNumOlss−1, inclusive, the value of vps_independent_layer_flag[GeneralLayerIdx[LayerIdInOls[i][0]]] should be equal to one. Each layer may be included in at least one OLS specified by the VPS. In other words, for each layer with a particular value of nuh_layer_id (e.g., nuhLayerId is equal to one of vps_layer_id[k] for k in the range of 0 to vps_max_layers_minus1, inclusive) there should be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId. Any layer in an OLS shall be an output layer of the OLS or a (direct or indirect) reference layer of an output layer of the OLS.

A vps_output_layer_flag[i][j] specifies whether the j-th layer in the i-th OLS is output when ols_mode_idc is equal to two. The vps_output_layer_flag[i] may be set equal to one to specify that the j-th layer in the i-th OLS is output. The vps_output_layer_flag[i] may be set equal to zero to specify that the j-th layer in the i-th OLS is not output. When vps_all_independent_layers_flag is equal to one and each_layer_is_an_ols_flag is equal to zero, the value of vps_output_layer_flag[i] can be inferred to be equal to one.

The variable OutputLayerFlag[i][j], for which the value one specifies that the j-th layer in the i-th OLS is output and the value zero specifies that the j-th layer in the i-th OLS is not output, may be derived as follows:

```
for( i = 0, i < TotalNumOlss; i ++ ) {
    OutputLayerFlag[ i ][ NumLayersInOls[ i ] − 1 ] = {
    for( j = 0; j < NumLayersInOls[ i ] − 1; j++ )
        if( ols_mode_idc[ i ] = = 0 )
            OutputLayerFlag[ i ][ i ] = 0
        else if( ols_mode_idc[ i ] = = 1 )
            OutputLayerFlag[ i ][ j ] = 1
        else if( ols_mode_idc[ i ] = = 2 )
            OutputLayerFlag[ i ][ j ] = vps_output_layer_flag[ i ][ j ]
}
```

The 0-th OLS contains only the lowest layer (e.g., the layer with nuh_layer_id equal to vps_layer_id[0]) and for the 0-th OLS the only included layer is output. A vps_constraint_info_present_flag may be set equal to one to specify that the general_constraint_info( )syntax structure is present in the VPS. The vps_constraint_info_present_flag may be set equal to zero to specify that the general_constraint_info( )syntax structure is not present in the VPS. The vps_reserved_zero_7 bits should be equal to zero in conforming bitstreams. Other values for vps_reserved_zero_7 bits are reserved. Decoders should ignore the value of vps_reserved_zero_7 bits.

A general_hrd_params_present_flag may be set equal to one to specify that the syntax elements num_units_in_tick and time_scale and the syntax structure general_hrd_parameters( )) are present in the SPS RBSP syntax structure. The general_hrd_params_present_flag may be set equal to zero to specify that the syntax elements num_units_intick and time_scale and the syntax structure general_hrd_parameters( )) are not present in the SPS RBSP syntax structure. A num_units_in_tick is the number of time units of a clock operating at the frequency time_scale hertz (Hz) that corresponds to one increment (called a clock tick) of a clock tick counter. The numunits_intick should be greater than zero. A clock tick, in units of seconds, is equal to the quotient of num_units_in_tick divided by time_scale. For example, when the picture rate of a video signal is twenty five Hz, time_scale may be equal to 27000000 and num_units_in_tick may be equal to 1080000, and consequently a clock tick may be equal to 0.04 seconds.

A time_scale is the number of time units that pass in one second. For example, a time coordinate system that measures time using a twenty seven megahertz (MHz) clock has a time_scale of 27000000. The value of time_scale should be greater than zero. A vps_extension_flag may be set equal to zero to specify that no vps_extension_data_flag syntax elements are present in the VPS RBSP syntax structure. The vps_extension_flag may be set equal to one to specify that there are vps_extension_dataflag syntax elements present in the VPS RBSP syntax structure. A vps_extension_data_flag may have any value. The presence and value of the vps_extension_data_flag do not affect decoder conformance to profiles. Conforming decoders should ignore all vps_extension_data_flag syntax elements.

Figure 8:
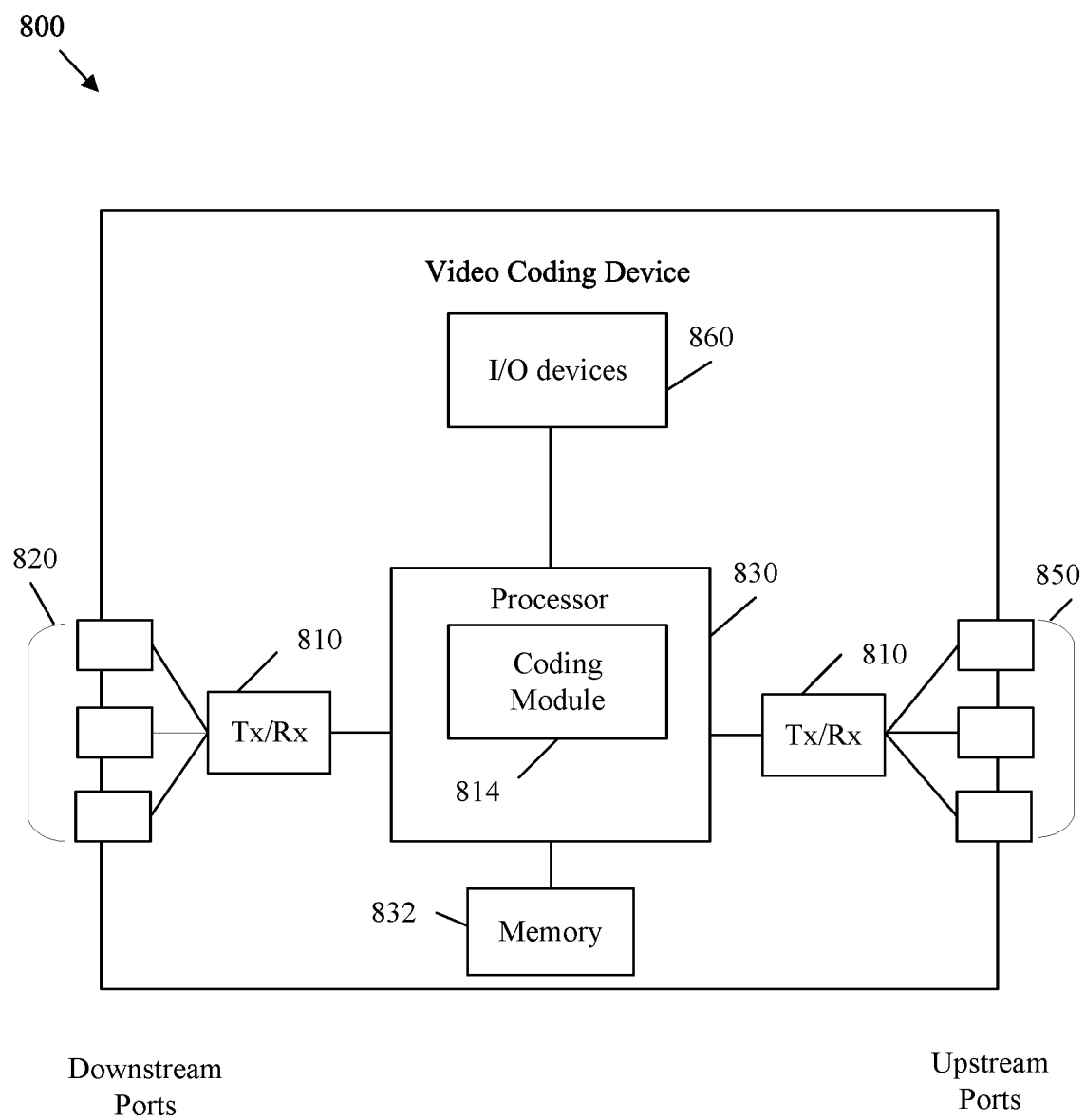
FIG. 8 is a schematic diagram of an example video coding device.

FIG. 8 is a schematic diagram of an example video coding device 800. The video coding device 800 is suitable for implementing the disclosed examples/embodiments as described herein. The video coding device 800 comprises downstream ports 820, upstream ports 850, and/or transceiver units (Tx/Rx) 810, including transmitters and/or receivers for communicating data upstream and/or downstream over a network. The video coding device 800 also includes a processor 830 including a logic unit and/or central processing unit (CPU) to process the data and a memory 832 for storing the data. The video coding device 800 may also comprise electrical, optical-to-electrical (OE) components, electrical-to-optical (EO) components, and/or wireless communication components coupled to the upstream ports 850 and/or downstream ports 820 for communication of data via electrical, optical, or wireless communication networks. The video coding device 800 may also include input and/or output (I/O) devices 860 for communicating data to and from a user. The I/O devices 860 may include output devices such as a display for displaying video data, speakers for outputting audio data, etc. The I/O devices 860 may also include input devices, such as a keyboard, mouse, trackball, etc., and/or corresponding interfaces for interacting with such output devices.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the downstream ports 820, Tx/Rx 810, upstream ports 850, and memory 832. The processor 830 comprises a coding module 814. The coding module 814 implements the disclosed embodiments described herein, such as methods 100, 900, and 1000, which may employ a multi-layer video sequence 500, a video sequence 600, and/or a bitstream 700. The coding module 814 may also implement any other method/mechanism described herein. Further, the coding module 814 may implement a codec system 200, an encoder 300, and/or a decoder 400. For example, the coding module 814 may be employed to code a video sequence into layers and/or OLSs to support multiview scalability. For example, the coding module 814 may encode and/or decode an ols_mode_idc syntax element into/from a VPS in a bitstream. The ols_mode_idc syntax element can indicate that a total number of OLSs in a video sequence is equal to the total number of layers specified in the VPS, that an i-th OLS includes layers zero to i, inclusive, and that for each OLS, all layers in the OLS are output. Hence, the coding module 814 may employ the ols_mode_idc syntax element to indicate/determine that all the layers received from a scalable video can be decoded and displayed as desired to implement multiview video. As such, coding module 814 causes the video coding device 800 to provide additional functionality and/or coding efficiency when coding video data. As such, the coding module 814 improves the functionality of the video coding device 800 as well as addresses problems that are specific to the video coding arts. Further, the coding module 814 effects a transformation of the video coding device 800 to a different state. Alternatively, the coding module 814 can be implemented as instructions stored in the memory 832 and executed by the processor 830 (e.g., as a computer program product stored on a non-transitory medium).

The memory 832 comprises one or more memory types such as disks, tape drives, solid-state drives, read only memory (ROM), random access memory (RAM), flash memory, ternary content-addressable memory (TCAM), static random-access memory (SRAM), etc. The memory 832 may be used as an over-flow data storage device, to store programs when such programs are selected for execution, and to store instructions and data that are read during program execution.

Figure 9:
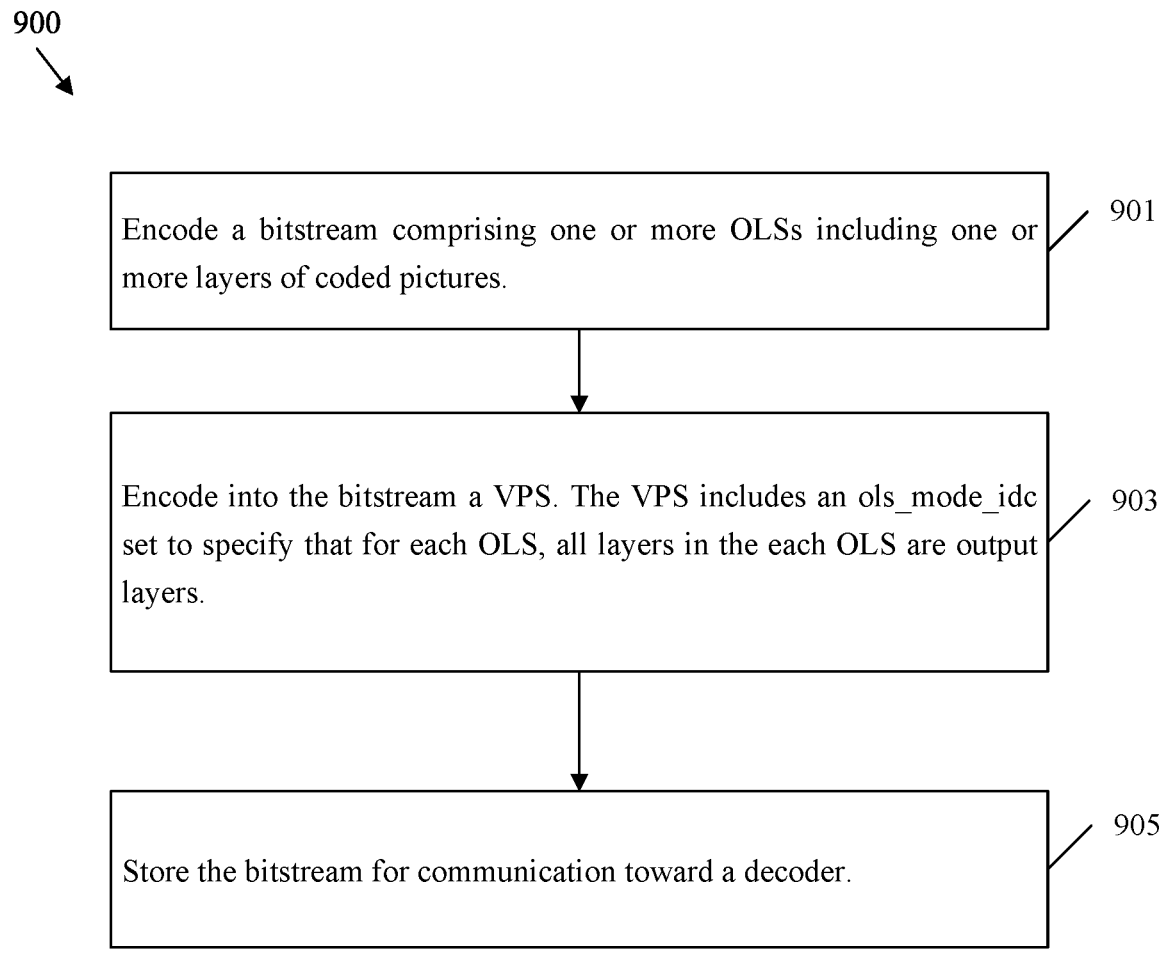
FIG. 9 is a flowchart of an example method of encoding a video sequence with OLSs configured for multiview scalability.

FIG. 9 is a flowchart of an example method 900 of encoding a video sequence with OLSs configured for multiview scalability, such as a multi-layer video sequence 500 and/or a video sequence 600 in a bitstream 700. Method 900 may be employed by an encoder, such as a codec system 200, an encoder 300, and/or a video coding device 800 when performing method 100.

Method 900 may begin when an encoder receives a video sequence and determines to encode that video sequence as a scalable multiview video sequence in a set of layers and OLSs, for example based on user input. The video sequence may be configured to support multiview and coded to support SNR scalability, spatial scalability, scalability according to other characteristics discussed herein, or combinations thereof. At step 901, the encoder can encode a bitstream comprising one or more OLSs including one or more layers of coded pictures. For example, the layers may include a base layer with a lowest layer ID and various enhancement layers with increasing layer IDs. Each enhancement layer with a layer ID of j may be coded according to inter-layer prediction based on the base layer and any enhancement layers with a layer ID of less than j. The OLSs may include OLS IDs, which may be denoted by i to distinguish over the layer IDs of j. For example, there may be one OLS per layer. As such, an OLS with an OLS ID of i may include an output layer with a layer ID of j where i is equal to i. The OLS with the OLS ID of i may also include all layers with layer IDs between zero and j−1, inclusive. In the present example, all layers may be set as output layers. As an example, an OLS with an OLS ID of five may include layers zero through five where each layer is indicated as an output layer.

At step 903, the encoder encodes a VPS into the bitstream. The configuration of the OLS and the layers may be indicated by the VPS. The VPS includes an ols_mode_idc syntax element. The ols_mode_idc can be set to specify that a total number of OLSs specified by the VPS is equal to a number of layers specified by the VPS. Further, the ols_mode_idc can be set to specify that an i-th OLS includes layers with layer indices from zero to i and/or j (e.g., i is equal to j in this case), inclusive. The ols_mode_idc may also be set to specify that for each OLS, all layers in the each OLS are output layers. For example, the ols_mode_idc may be set to one of several modes. The mode described above may be signaled when ols_mode_idc is set to one. In some examples, the VPS may also include a vps_max_layers_minus1 that specifies the number of layers specified by the VPS. This is also a maximum allowed number of layers in each CVS referring to the VPS. The ols_mode_idc may reference the vps_max_layers_minus1.

As an example, the video sequence can be decoded at the decoder and/or at a hypothetical reference decoder (HRD) at the encoder for standards verification purposes. When decoding the video sequence, a total number of OLSs (TotalNumOlss) variable for the video sequence can be set equal to vps_max_layers_minus1 plus one when an each_layer_is_an_ols_flag in the VPS is set to zero, when the ols_mode_idc is set to zero, or when the ols_mode_idc is set to one. As a specific example, a number of layers in an i-th OLS (NumLayersInOls[i]) and a layer ID in an OLS (LayerIdInOLS[i][j]) specifying a nuh_layer_id value of a j-th layer in the i-th OLS can be derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
  if( each_layer_is_an_ols_flag ) {
    NumLayersInOls[ i ] = 1
    LayerIdInOls[ i ][ 0 ] = vps_layer_id[ i ]
  } else if( ols_mode_idc = = 0 | | ols_mode_idc = = 1 ) {
    NumLayersInOls[ i ] = i + 1
    for( j = 0; j < NumLayersInOls[ i ]; j++ )
      LayerIdInOls[ i ][ j ] = vps_layer_id[ j ]
``` where vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer. Once the IDs of the OLSs and the IDs of the output layers are known, a HRD at the encoder can begin decoding the coded pictures in the output layers by employing inter-layer prediction in order to perform conformance tests to ensure the video complies with standards.

At step 905, the encoder can store the bitstream for communication toward a decoder. For example, the decoder may be aware of the available OLSs (e.g., via communication and/or other protocols such as dynamic adaptive streaming over hypertext transfer protocol (DASH)). The decoder can select and request the OLS with the highest ID that can be properly decoded/displayed by the decoder. For example, in the spatial scalability case, the decoder can request the OLS with multiview video and a picture size associated with screen(s) connected to the decoder. In the SNR scalability case, the decoder can request the highest ID OLS with multiview video that can be decoded in light of current network conditions (e.g., in light of available communication bandwidth). The encoder and/or an intermediate cache or content server can then transmit the OLS and associated layer(s) to the decoder for decoding. As such, the encoder can create a multiview video sequence that can scale up or down based on the needs of the decoder.

Figure 10:
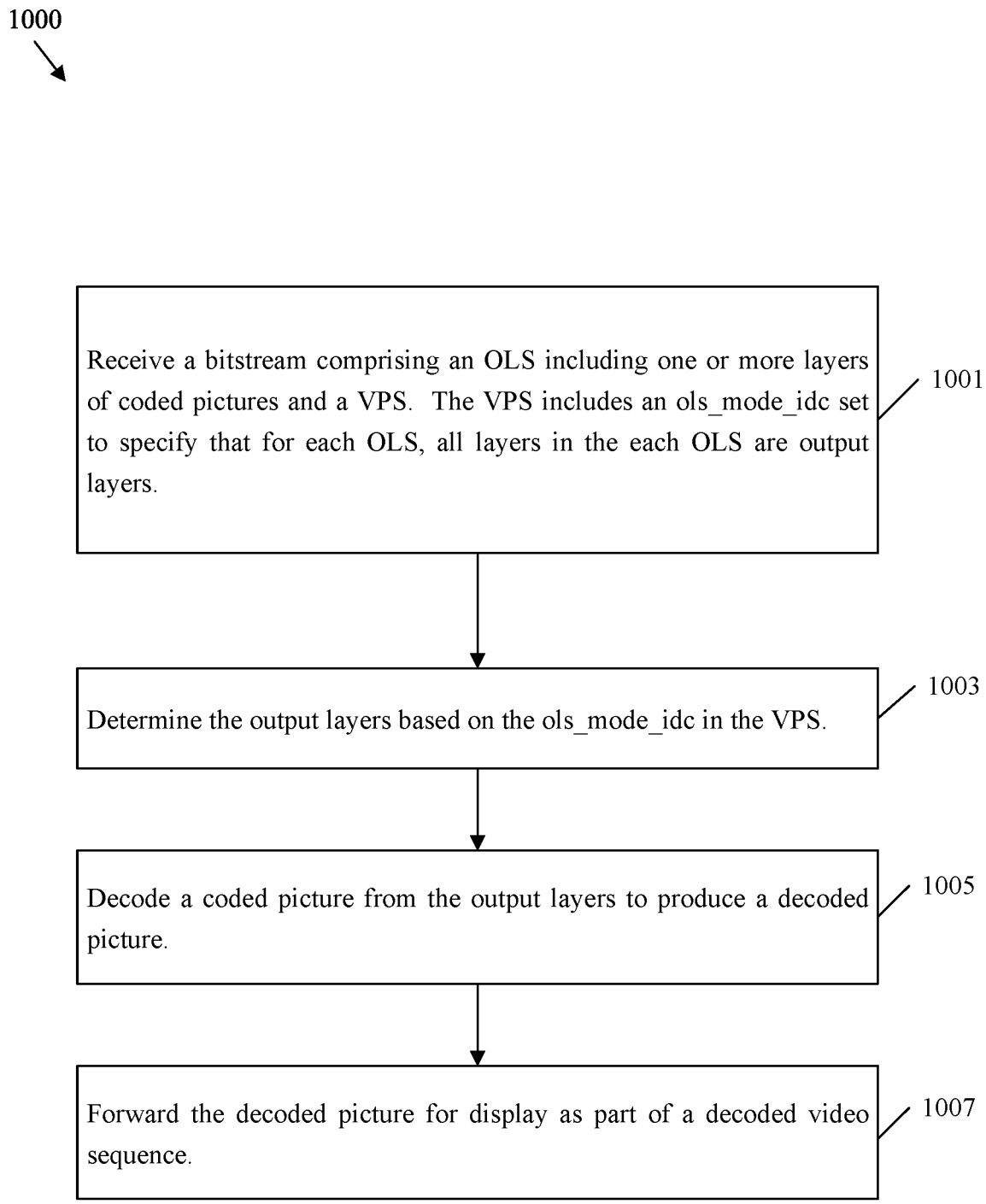
FIG. 10 is a flowchart of an example method of decoding a video sequence including an OLS configured for multiview scalability.

FIG. 10 is a flowchart of an example method 1000 of decoding a video sequence including an OLS configured for multiview scalability, such as a multi-layer video sequence 500 and/or a video sequence 600 in a bitstream 700. Method 1000 may be employed by a decoder, such as a codec system 200, a decoder 400, and/or a video coding device 800 when performing method 100.

Method 1000 may begin when a decoder begins receiving a bitstream containing an OLS with a set of layer(s) of a scalable multiview video sequence, for example as a result of method 900. The video sequence may be coded to support SNR scalability, spatial scalability, scalability according to other characteristics discussed herein, or combinations thereof. At step 1001, the decoder can receive a bitstream comprising an OLS and a VPS. For example, the OLS may include one or more layers of coded pictures. The layers may include a base layer with a lowest layer ID and various enhancement layers with increasing layer IDs. Each enhancement layer with a layer ID of j may be coded according to inter-layer prediction based on the base layer and any enhancement layers with a layer ID of less than j. The OLS may include an OLS ID, which may be denoted by i to distinguish over the layer IDs of j. For example, there may be one OLS in an encoded bitstream per layer. As such, an OLS with an OLS ID of i may include an output layer with a layer ID of j where i is equal to i. An OLS that is received with the OLS ID of i may also include all layers with layer IDs between zero and j−1, inclusive. In the present example, all layers may be set as output layers. As an example, a received OLS with an OLS ID of five may include layers zero through five where each layer is indicated as an output layer. The configuration of the OLS and the layers may be indicated by the VPS.

For example, the VPS includes an ols_mode_idc syntax element. The ols_mode_idc can be set to specify that a total number of OLSs specified by the VPS is equal to a number of layers specified by the VPS. Further, the ols_mode_idc can be set to specify that an i-th OLS includes layers with layer indices from zero to i and/or j (e.g., i is equal to j in this case), inclusive. The ols_mode_idc may also be set to specify that for each OLS, all layers in the each OLS are output layers. For example, the ols_mode_idc may be set to one of several modes. The mode described above may be signaled when ols_mode_idc is set to one. In some examples, the VPS may also include a vps_max_layers_minus1 that specifies the number of layers specified by the VPS. This is also a maximum allowed number of layers in each CVS referring to the VPS. The ols_mode_idc may reference the vps_max_layers_minus1.

At step 1003, the decoder can determine the output layers based on the ols_mode_idc in the VPS. As a specific example, when determining the configuration of a video sequence, a total number of OLSs (TotalNumOlss) variable for the video sequence can be set equal to vps_max_layers_minus1 plus one when an each_layer_is_an_ols_flag in the VPS is set to zero, when the ols_mode_idc is set to zero, or when the ols_mode_idc is set to one. As a specific example, a number of layers in an i-th OLS (NumLayersInOls[i]) and a layer ID in an OLS (LayerIdInOLS[i][j]) specifying a nuh_layer_id value of a j-th layer in the i-th OLS can be derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc = = 0 | | ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ j ]
``` where vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer.

Using the IDs of the output layers, the decoder can decode the coded picture(s) from the output layers to produce decoded picture(s) at step 1005. For example, the decoder can decode all of the output layers using inter-layer prediction to decode higher layers based on lower layers as desired. The decoder can also select layers to implement multiview. At step 1007, the decoder can forward the decoded picture for display as part of a decoded video sequence. For example, the decoder may forward decoded pictures from a first layer for display on a first screen (or portion thereof) and forward pictures from a second layer set for display on a second screen (or portion thereof).

As a specific example, the decoder may be aware of the available OLSs (e.g., via communication and/or other protocols such as dynamic adaptive streaming over hypertext transfer protocol (DASH)). The decoder can select and request the OLS with the highest ID that can be properly decoded/displayed by the decoder. For example, in the spatial scalability case, the decoder can request the OLS with a picture size associated with a screen connected to the decoder. In the SNR scalability case, the decoder can request the highest ID OLS that can be decoded in light of current network conditions (e.g., in light of available communication bandwidth). The encoder and/or an intermediate cache or content server can then transmit the OLS and associated layer(s) to the decoder for decoding to support multiview. As such, the encoder can create a multiview video sequence that can scale up or down based on the needs of the decoder. The decoder can then decode the requested video sequence upon receipt by employing method 1000.

Figure 11:
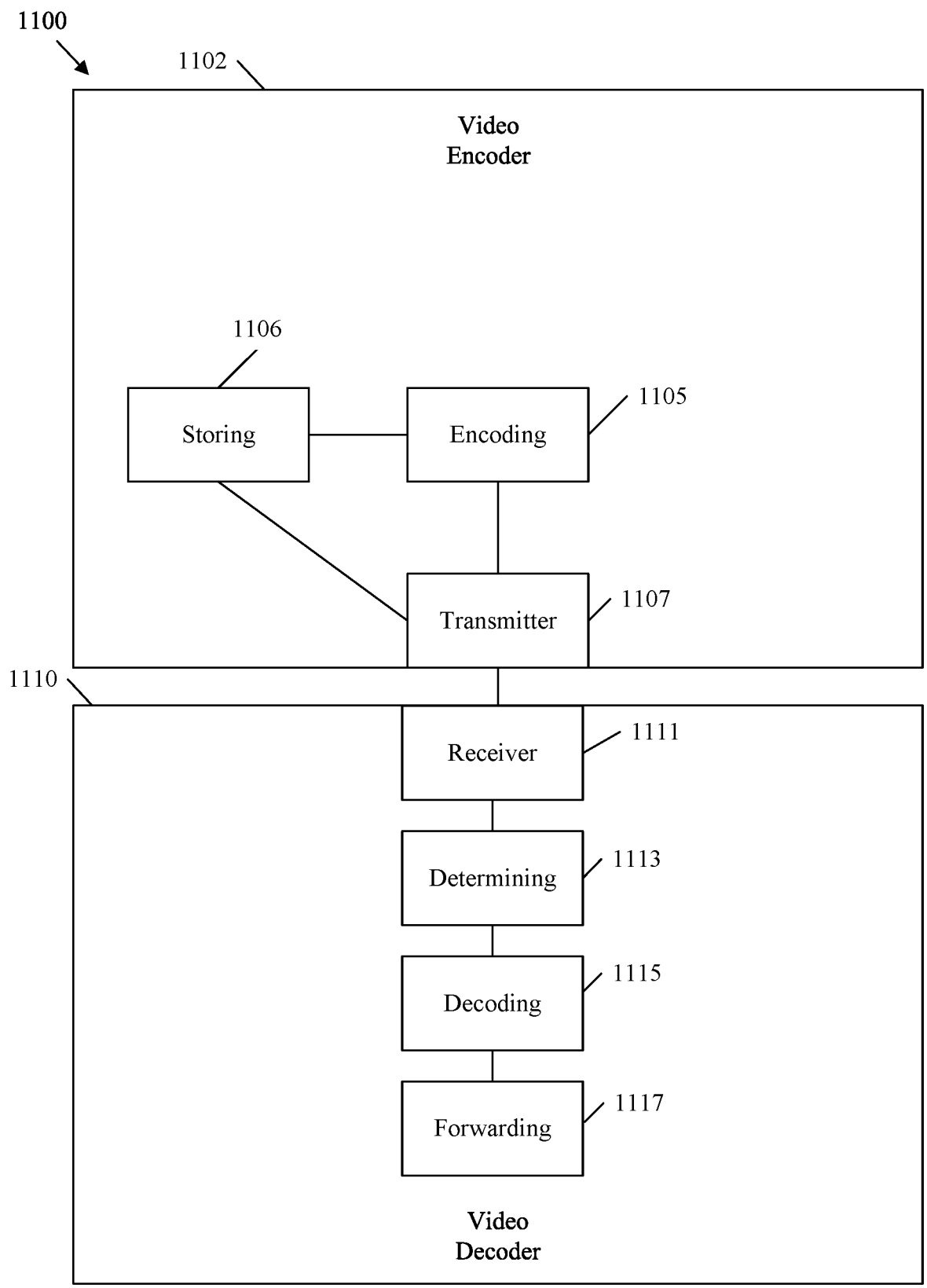
FIG. 11 is a schematic diagram of an example system for coding a video sequence with OLSs configured for multiview scalability.

FIG. 11 is a schematic diagram of an example system 1100 for coding a video sequence with OLSs configured for multiview scalability, such as a multi-layer video sequence 500 and/or a video sequence 600 in a bitstream 700. System 1100 may be implemented by an encoder and a decoder such as a codec system 200, an encoder 300, a decoder 400, and/or a video coding device 800. In addition, system 1100 may be employed when implementing method 100, 900, and/or 1000.

The system 1100 includes a video encoder 1102. The video encoder 1102 comprises an encoding module 1105 for encoding a bitstream comprising one or more OLSs including one or more layers of coded pictures. The encoding module 1105 is further for encoding into the bitstream a VPS, wherein the VPS includes an ols_mode_idc specifying that for each OLS, all layers in the each OLS are output layers. The video encoder 1102 further comprises a storing module 1106 for storing the bitstream for communication toward a decoder. The video encoder 1102 further comprises a transmitting module 1107 for transmitting the bitstream toward a video decoder 1110. The video encoder 1102 may be further configured to perform any of the steps of method 900.

The system 1100 also includes a video decoder 1110. The video decoder 1110 comprises a receiving module 1111 for receiving a bitstream comprising an OLS and a VPS, wherein the OLS includes one or more layers of coded pictures and the VPS includes an ols_mode_idc specifying that for each OLS, all layers in the each OLS are output layers. The video decoder 1110 further comprises a determining module 1113 for determining the output layers based on the ols_mode_idc in the VPS. The video decoder 1110 further comprises a decoding module 1115 for decoding a coded picture from the output layers to produce a decoded picture. The video decoder 1110 further comprises a forwarding module 1115 for forwarding the decoded picture for display as part of a decoded video sequence. The video decoder 1110 may be further configured to perform any of the steps of method 1000.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
receiving a bitstream comprising an output layer set (OLS) and a video parameter set (VPS), wherein the OLS includes one or more layers of coded pictures and the VPS includes an OLS mode identification code (ols_mode_idc) specifying that, for each OLS, all layers in each OLS are output layers, wherein the VPS includes a VPS maximum layers minus one (vps_max_layers_minus1) plus one that specifies a number of layers specified by the VPS, which is a maximum allowed number of layers in each coded video sequence (CVS) referring to the VPS, and wherein the ols_mode_idc specifies that a total number of OLSs specified by the VPS is equal to the number of layers specified by the VPS where an i-th OLS includes layers with layer indices from zero to i, inclusive;
determining the output layers based on the ols_mode_idc in the VPS; and
decoding a coded picture from the output layers to produce a decoded picture.

2. The method of claim 1, wherein the ols_mode_idc is equal to one.

3. The method of claim 1, wherein a total number of OLSs (TotalNumOlss) is equal to vps_max_layers_minus1 plus one when the ols_mode_idc is equal to zero or when the ols_mode_idc is equal to one.

4. The method of claim 1, wherein a number of layers in an i-th OLS (NumLayersInOls[i]), specifying the number of layers in the i-th OLS, and a layer identifier (ID) in an OLS (LayerIdInOLS[i][j]), specifying a network abstraction layer (NAL) unit header layer identifier (nuh_layer_id) value of a j-th layer in the i-th OLS, are derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
    } else if( ols_mode_idc = = 0 | | ols_mode_idc = = 1 ) {
        NumLayersInOls[ i ] = i + 1
        for( j = 0; j < NumLayersInOls[ i ]; j++ )
            LayerIdInOls[ i ][ j ] = vps_layer_id[ i ]
``` wherein vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer.

5. A method implemented by an encoder, the method comprising:
encoding a bitstream comprising one or more output layer sets (OLSs) including one or more layers of coded pictures;
encoding into the bitstream a video parameter set (VPS), wherein the VPS includes an OLS mode identification code (ols_mode_idc) specifying that for each OLS, all layers in each OLS are output layers, wherein the VPS includes a VPS maximum layers minus one (vps_max_layers_minus1) plus one that specifies a number of layers specified by the VPS, which is a maximum allowed number of layers in each coded video sequence (CVS) referring to the VPS, and wherein the ols_mode_idc specifies that a total number of OLSs specified by the VPS is equal to the number of layers specified by the VPS where an i-th OLS includes layers with layer indices from zero to i, inclusive; and
storing the bitstream for communication toward a decoder.

6. The method of claim 5, wherein the ols_mode_idc is equal to one.

7. The method of claim 5, wherein a total number of OLSs (TotalNumOlss) is equal to vps_max_layers_minus1 plus one when the ols_mode_idc is equal to zero or when the ols_mode_idc is equal to one.

8. The method of claim 5, wherein a number of layers in an i-th OLS (NumLayersInOls[i]), specifying the number of layers in the i-th OLS, and a layer identifier (ID) in an OLS (LayerIdInOLS[i][j]), specifying a network abstraction layer (NAL) unit header layer identifier (nuh_layer_id) value of a j-th layer in the i-th OLS, are derived as follows:

```
NumLayersInOls[ 0 ] = 1
LayerIdInOls[ 0 ][ 0 ] = vps_layer_id[ 0 ]
for( i = 1, i < TotalNumOlss; i++ ) {
   if( each_layer_is_an_ols_flag ) {
      NumLayersInOls[ i ] = 1
      LayerIdInOls[ i ][ 0 ] = vps_layer_id[ i ]
   } else if( ols_mode_idc = = 0 | | ols_mode_idc = = 1 ) {
      NumLayersInOls[ i ] = i + 1
      for( j = 0; j < NumLayersInOls[ i ]; j++ )
         LayerIdInOls[ i ][ j ] = vyps_layer_id[ j ]
``` wherein vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer.

9. A video coding device comprising:

a receiver configured to receive a bitstream comprising an output layer set (OLS) and a video parameter set (VPS), wherein the OLS includes one or more layers of coded pictures and the VPS includes an OLS mode identification code (ols_mode_idc) specifying that, for each OLS, all layers in each OLS are output layer, wherein the VPS includes a VPS maximum layers minus one (vps_max_layers_minus1) plus one that specifies a number of layers specified by the VPS, which is a maximum allowed number of layers in each coded video sequence (CVS) referring to the VPS, and wherein the ols_mode_idc specifies that a total number of OLSs specified by the VPS is equal to the number of layers specified by the VPS where an i-th OLS includes layers with layer indices from zero to i, inclusive; and a processor coupled to the receiver and configured to:

determine the output layers based on the ols_mode_idc in the VPS; and decode a coded picture from the output layers to produce a decoded picture.

10. The video coding device of claim 9, wherein the ols_mode_idc is equal to one.

11. The video coding device of claim 9, wherein a total number of OLSs (TotalNumOlss) is equal to vps_max_layers_minus1 plus one when the ols_mode_idc is equal to zero or when the ols_mode_idc is equal to one.

12. The video coding device of claim 9, wherein a number of layers in an i-th OLS (NumLayersInOls[i]), specifying the number of layers in the i-th OLS, and a layer identifier (ID) in an OLS (LayerIdInOLS[i][j]), specifying a network abstraction layer (NAL) unit header layer identifier (nuh_layer_id) value of a j-th layer in the i-th OLS, are derived as follows:

```
NumLayersInOls[ 0 ] = 1LayerIdInOls[ 0 ][ 0 ] =
vps_layer_id[ 0 ]for( i = 1, i < TotalNumOlss; i++ ) {
   if( each_layer_is_an_ols_flag ) {
      NumLayersInOls[ i ] = 1
      LayerIdInOls[ i ][ 0 ] = vps_layer_id[ i ]
   } else if( ols_mode_idc == 0 || ols_mode_idc == 1 ) {
      NumLayersInOls[ i ] = i + 1
      for( j = 0; j < NumLayersInOls[ i ]; j++ )
         LayerIdInOls[ i ][ j ] = vps_layer_id[ j ]
``` wherein vps_layer_id[i] is an i-th VPS layer identifier, TotalNumOlss is a total number of OLSs specified by the VPS, and an each_layer_is_an_ols_flag is an each layer is an OLS flag that specifies whether at least one OLS contains more than one layer.

* * * * *